(12) United States Patent
Daniels

(10) Patent No.: US 7,161,590 B2
(45) Date of Patent: Jan. 9, 2007

(54) THIN, LIGHTWEIGHT, FLEXIBLE, BRIGHT, WIRELESS DISPLAY

(76) Inventor: John James Daniels, 511 Foot Hills Rd., Higganum, CT (US) 06441

( * ) Notice: Subject to any disclaimer, the term of this patent is extended or adjusted under 35 U.S.C. 154(b) by 322 days.

(21) Appl. No.: 10/234,302

(22) Filed: Sep. 4, 2002

(65) Prior Publication Data

US 2004/0041800 A1    Mar. 4, 2004

(51) Int. Cl.
*G09G 5/00* (2006.01)

(52) U.S. Cl. .................. 345/204; 345/107; 345/173

(58) Field of Classification Search ............. 345/173, 345/179, 204, 107, 157; 313/498; 340/825.69
See application file for complete search history.

(56) References Cited

U.S. PATENT DOCUMENTS

| | | | | |
|---|---|---|---|---|
| 4,694,124 | A * | 9/1987 | Blesser | 178/18.07 |
| 5,821,688 | A * | 10/1998 | Shanks et al. | 313/498 |
| 5,963,145 | A * | 10/1999 | Escobosa | 340/825.72 |
| 5,965,979 | A * | 10/1999 | Friend et al. | 313/504 |
| 6,087,196 | A * | 7/2000 | Sturm et al. | 438/29 |
| 6,127,941 | A * | 10/2000 | Van Ryzin | 340/825.69 |
| 6,191,847 | B1 * | 2/2001 | Melendez et al. | 356/73 |
| 6,193,161 | B1 * | 2/2001 | Sojka et al. | 235/472.01 |
| 6,395,328 | B1 | 5/2002 | May | |
| 6,402,579 | B1 | 6/2002 | Pichler et al. | |
| 6,416,885 | B1 | 7/2002 | Towns et al. | |
| 6,420,200 | B1 | 7/2002 | Yamazaki et al. | |
| 6,422,687 | B1 | 7/2002 | Jacobson | |
| 6,825,829 | B1 * | 11/2004 | Albert et al. | 345/107 |
| 2002/0141801 | A1 * | 10/2002 | Shimoda et al. | 400/76 |
| 2003/0201192 | A1 * | 10/2003 | Prince et al. | 205/775 |

* cited by examiner

*Primary Examiner*—Richard Hjerpe
*Assistant Examiner*—Kimnhung Nguyen
(74) *Attorney, Agent, or Firm*—Michaud-Duffy Group LLP

(57) ABSTRACT

A multilayered thin, lightweight, flexible, bright, wireless display having components capable of being manufactured by a printing method. A flexible substrate provides a support structure upon which components can be manufactured by a printing method. A display stratum includes light emitting pixels for displaying information. The light emitting pixels are formed by printing a pixel layer of light-emitting conductive polymer. An electronic circuit stratum includes signal transmitting components for transmitting user input signals to a display signal generating device for controlling display information transmitted from the display signal generating device. Signal receiving components receive the display information transmitted from the display signal generating device. Display driving components drive the display layer according to the received display information. A user input stratum receives user input and generates the user input signals. A battery stratum provides electrical energy to the electronic circuit stratum, the user input stratum and display stratum components. The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display stratum and the second display information at a second location on the display stratum. At least some of the components in the battery, display, user input and electronic circuit stratums are formed by printing electrically active material to form circuit elements including resistors, capacitors, inductors, antennas, conductors and semiconductor devices.

19 Claims, 30 Drawing Sheets

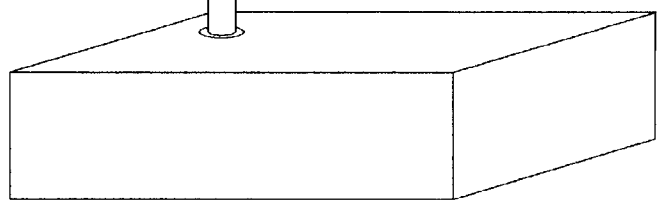

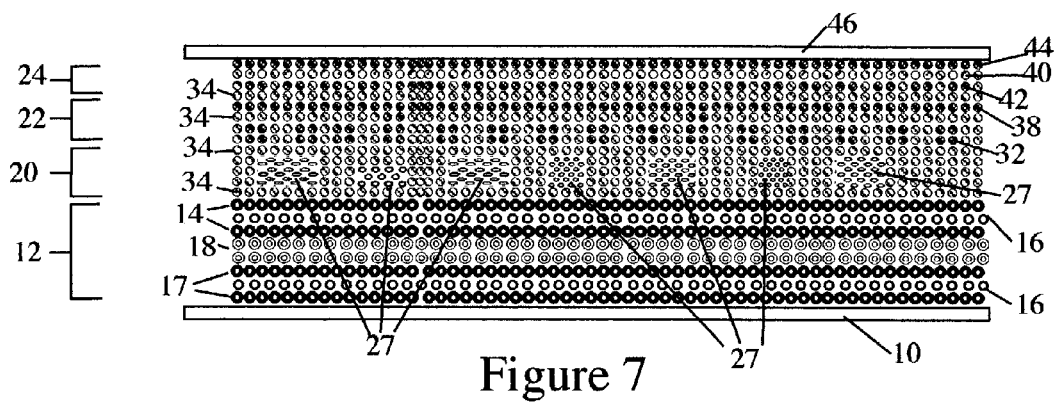
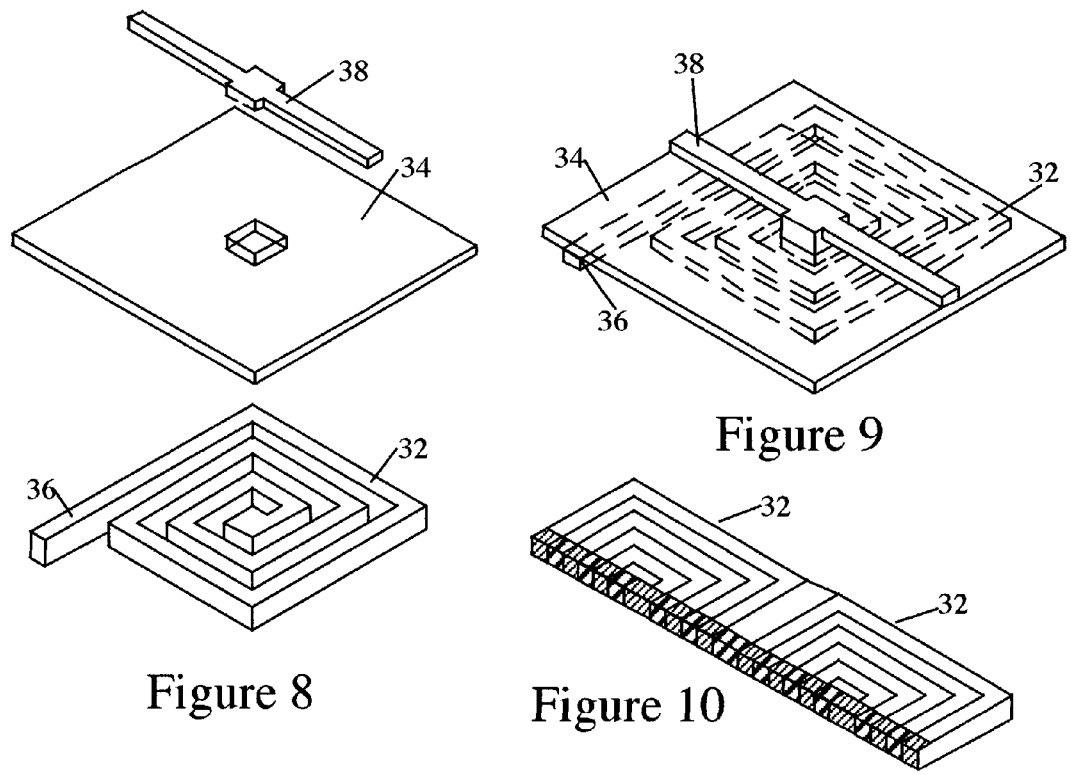
Figure 7
Figure 8
Figure 9
Figure 10

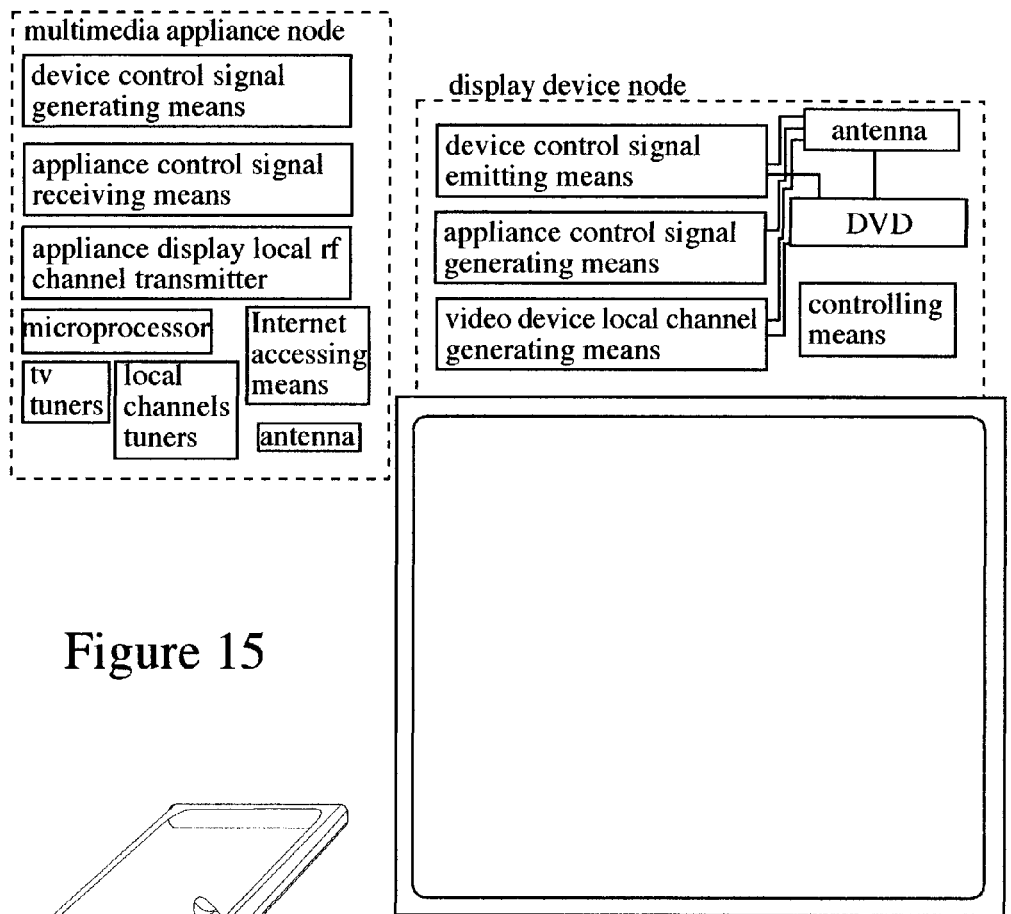
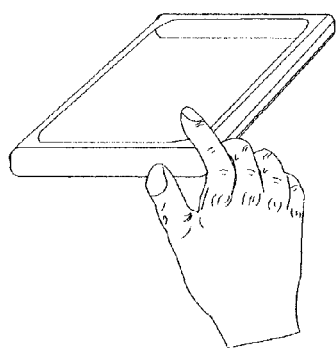
Figure 15

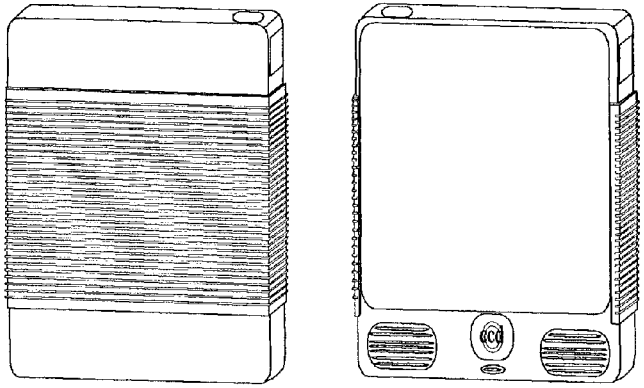
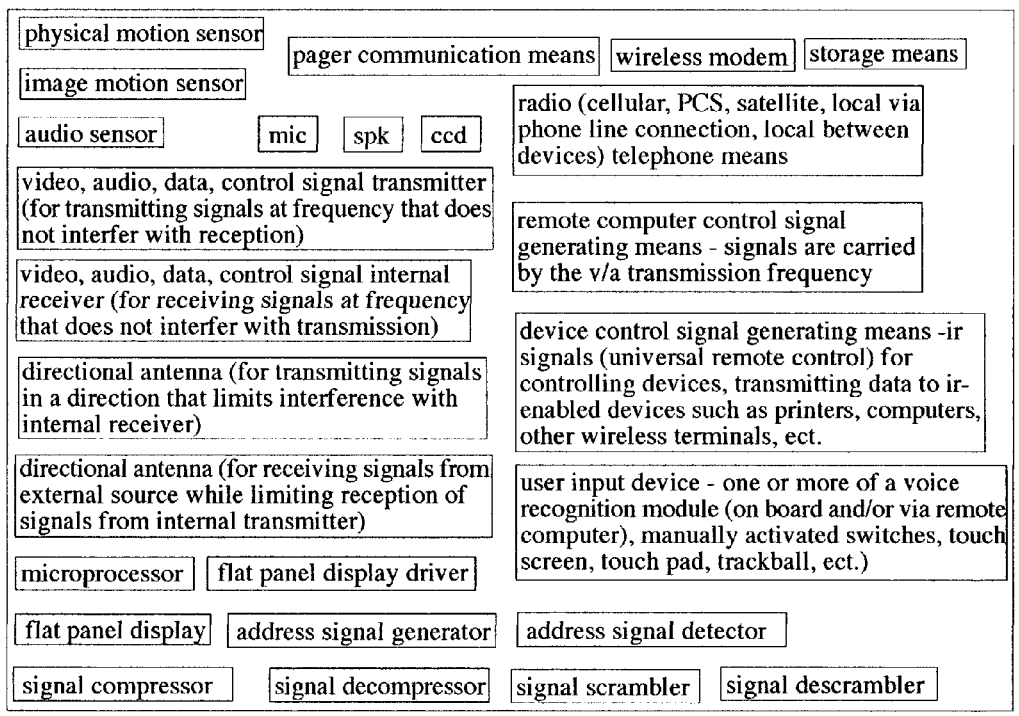
Figure 16

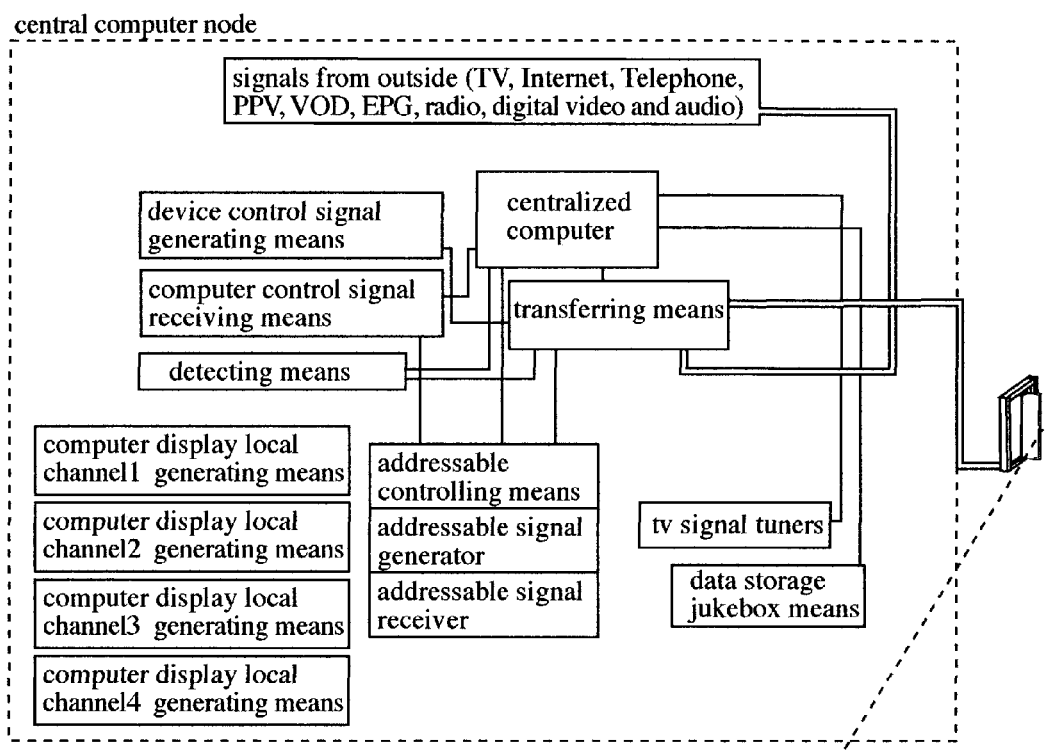
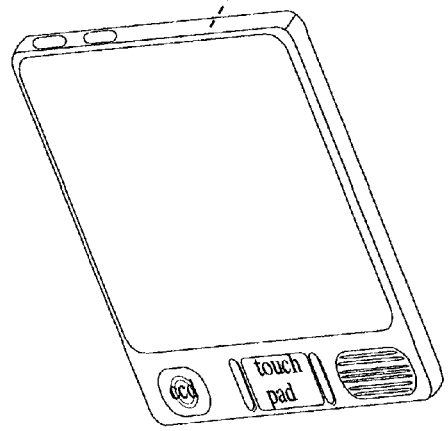
Figure 18

| Page Data: | | |
|---|---|---|
| Page Title: | page location: videoA1 frame1 | |

| Link Data: | | | |
|---|---|---|---|
| Link Title: | image location: | linked to: | operation: |
| about them company | 486,324;509,356 | videoA1 frame2 | goto linked page |
| fact sheet | 398,376;550,431 | videoA1 frame3 | goto linked page |
| view features | 498,444;547,521 | videoA1 frame4 | goto linked page |
| next | 385,513;436,526 | videoA1 frame5 | goto linked page |
| pointblank design | 169,603;276,619 | nycs8@aol.com | open new email; connect to WWW |

00101110110110000101011010100011111  binary value screen pixels illustration of sending binary video data stream - using just the on-off state of the individual pixels } hyperlink, page info and other non-videographic page info } videographic page

THIN, LIGHTWEIGHT, FLEXIBLE, BRIGHT, WIRELESS DISPLAY

CROSS REFERENCE TO RELATED APPLICATIONS

This application is related to co-pending U.S. patent application Ser. No. 10/234,301 entitled "Printer and Method for Manufacturing Electronic Circuits and Displays" filed Sep. 4, 2002 and U.S. patent application Ser. No. 10/716,794 entitled "Organic and Inorganic Light Active Devices and Methods for Making Same filed Nov. 19, 2003.

BACKGROUND OF THE INVENTION

The present invention pertains to a thin, lightweight, flexible, bright, wireless display. Further, the present invention pertains to a wireless display device capable of displaying information received from multiple sources.

Webtablets and notebook computers are known for providing mobile display of Internet content. However, such devices require expensive microprocessors to be effective for their intended purpose, require operating system and usually the purchase of a software license. To provide mobile network access, for connecting a network, such as the Internet or another computer, these devices utilize a wireless signal to communicate between the device and a modem. Such a system simply creates a wireless communication link between the onboard processor and storage of the mobile display and a modem hardwired to a wire phoneline, Ethernet or coaxial cable network. Even when wirelessly networked to a desktop computer or the Internet via a modem, these devices can only receive information from a single source at once, making them not useful for combined display activities such as simultaneous web browsing and TV watching. Such devices quickly become obsolete when the next generation of microprocessors become available or there is a software upgrade. The eyes will always be used to view images from a display and the ears will always be used to hear audio from a speaker, thus, if a wireless display device can be provided which is not dependent on an onboard computer processor for displaying images, a multimedia system that includes such a display will be upgraded when the signal source (computer, DVD, stereo system, now PVRs, video phones, etc) are upgraded.

Recently, there has been activity in developing thin, flexible displays that utilize pixels of electroluminescent materials, such as organic light emitting diodes (OLEDs). Such displays do not require any back lighting since each pixel element generates its own light. Typically, the organic materials are deposited by spin-coating or evaporation. U.S. Pat. No. 6,395,328, issued to May, teaches an organic light emitting color display wherein a multi-color device is formed by depositing and patterning layers of light emissive material. U.S. Pat. No. 5,965,979, issued to Friend, et al., teaches a method of making a light emitting device by laminating two self-supporting components, at least one has a light emitting layer. U.S. Pat. No. 6,087,196, issued to Strum, et al., teaches a fabrication method for forming organic semiconductor devices using ink jet printing. U.S. Pat. No. 6,416,885 B1, issued to Towns et al., teaches an electroluminescent device wherein a conductive polymer layer between an organic light emitting layer and a charge-injecting layer resists lateral spreading of charge carriers to improve the display characteristics. U.S. Pat. No. 6,420,200, issued to Yamazaki et al., teaches a method of manufacturing an electro-optical device using a relief printing or screen printing method. U.S. Pat. No. 6,402,579 B1, issued to Pichler et al., teaches an organic light-emitting device in which a multilayer structure is formed by DC magnetron sputtering. U.S. Pat. No. 6,422,687, issued to Jacobson, teaches an electronically addressable microencapsulated ink and display.

The prior art shows that organic light-emitting pixels may be formed into a display using various manufacturing techniques. For example, the '196 patent shows that an OLED can be fabricated using an inkjet printer. The '687 patent shows that various electronic circuit elements may be formed from microencapsulated electronically active materials.

The teachings of the prior art indicate that it is possible to create a thin, lightweight, flexible, bright, display in which OLED pixels are formed using various methods including ink jet printing techniques. However, no prior art addresses the practical requirement of providing such a display with an incorporated user input mechanism. Further, no prior art recognizes the need to format and transmit content, such as HTML pages, so that it can be displayed without requiring substantial on-board data processing. Data processing components, such as microprocessors, consume power, are relatively expensive, difficult to manufacture and require complex electrical circuits. Thus, having a thin, bright, wireless display with substantial onboard processing severely limits the effectiveness of the display. Further, there is no prior art that provides such a display that is capable of receiving two or more display information signals simultaneously so that, for example, a television program can be viewed at the same time that a webpage is displayed. Accordingly, there is a need for a thin, lightweight, flexible, bright, wireless display which has an effective user input mechanism, is constructed to maximize the power density and efficient power consumption of an onboard battery, and which can be manufactured, at least in part, using printing methods.

SUMMARY OF THE INVENTION

It is an object of the present invention to overcome the drawbacks of the prior art and provide a wireless display terminal. The inventive wireless display terminal receives a video signal originating from a computer, multimedia or other audio and/or video signal generating device and transmitted via RF signals.

In a preferred embodiment, a thin, lightweight, flexible, bright, wireless display is disclosed that can be manufactured at least in part using a printing method. A printer and such a printing method is disclosed in a co-owned U.S. patent application Ser. No. 10/234,301 filed concurrently herewith entitled Printer and Method for Forming Electronic Circuits and Displays. This patent application is incorporated by reference herein.

In accordance with the preferred embodiment of the wireless display, a thin, lightweight, flexible, bright wireless display having components capable of being manufactured by a printing method is obtained. A flexible substrate provides a support structure upon which components can be manufactured by a printing method. A display stratum includes light emitting pixels for displaying information. The light emitting pixels are formed by printing a pixel layer of light-emitting conductive polymer. An electronic circuit stratum includes signal transmitting components for transmitting user input signals to a display signal generating device for controlling display information transmitted from the display signal generating device. Signal receiving components receive the display information transmitted from the display signal generating device. Display driving components drive the display layer according to the received display information. A user input stratum receives user input and generates the user input signals. A battery stratum provides electrical energy to the electronic circuit stratum, the user input stratum and display stratum components. The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display stratum and the second display information at a second location on the display stratum. At least some of the components in the battery, display, user input and electronic circuit stratums are formed by printing electrically active material to form circuit elements including resistors, capacitors, inductors, antennas, conductors and semiconductor devices.

The battery stratum may comprise a first current collector layer; an anode layer; an electrolyte layer; a cathode layer and a second current collector layer. In accordance with the present invention, the electrolyte material may be microencapsulated. This feature of the present invention makes the battery stratum particularly suitable for formation by a printing method, such as inkjet printing, laser printing, magnetically reactive printing, electrostatically reactive printing, or other printing methods that are adaptable to the use of microencapsulated materials. The battery stratum is formed substantially over the entire top surface of the flexible substrate. By this construction, the inventive wireless display device may be formed as thin as possible, while having suitable battery power density, and while being provided with the advantageous electronic shielding qualities provided by the battery layers. The user input stratum may comprise a grid of conductive elements each conductive elements for inducing a detectable electrical signal in response to a moving magnetic field. The user input stratum may comprise a touch screen formed by printing pressure sensitive or capacitance sensitive elements on an insulative layer.

The display stratum may include conductive leads connected with each light emitting pixel for applying the electrical energy selectively to each light emitting pixel under the control of the display driving components.

The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display stratum and the second display information at a second location on the display stratum.

At least some of the components in the electronic circuit stratum are formed by printing electrically active material to form circuit elements including resistors, capacitors, inductors, antennas, conductors and semiconductor devices.

A content formatting method of formatting substantially static display content is disclosed that greatly reduces the onboard processing capacity required by the wireless display. This content formatting method is effective for enabling a large number of simultaneous users. The source computer composes the substantially static display content into a video frame of information. The wireless display only needs as much memory as is needed to store the desired number of single frames of video information. For example, a 30 page word processing document would require about one second of video storage to display at NTSC resolution. This image quality may be too low for the useful displaying of text, and HDTV resolution may be a better choice. In any event, the wireless display does not require on board microprocessing power, expensive software licensing for operating system and application software, and will not become obsolete. The inventive wireless display simply needs the ability to store, retrieve and display video information.

In accordance with the present invention, a number of embodiments of a wireless display terminal are provided. The wireless display terminal receives a video signal originating from a centralized computer and transmitted via RF signals from an antenna node. The antenna node may be located in the proximity of the centralized computer, or may be connected to the centralized computer through a wire network, such as a phone line, co-axial cable, electrical power line, fiber optic, data line, or other wire network. The wireless display terminal may also simultaneously or separately receive signals from a second video and/or audio signal source, such as a video recorder, set top box, telephone system, video camera, intercom, security system, home automation system, personal video recorder, or other video and/or audio signal generator. The video and/or audio signals are again transmitted via RF signals from the antenna node located in proximity with the video and/or audio signal source or connected to the source through the wire network. The inventive wireless display device can be configured so as to be capable of simultaneously displaying information received from multiple sources.

In accordance with an embodiment of the invention, the inventive wireless display terminal may include video and/or audio signal generating and transmitting components, such as a CCD camera, microphone and RF signal transmitter. The wireless display terminal may thus, be used for two-way audio and/or video communication with various display devices connected to the inventive network, and through the network connection, with various external devices and systems. For example, the wireless display terminal can be used as a remote video and audio link for external communication through a telephone or video conferencing system, and through the Internet or other network system. The wireless display terminal may also be used for a video and/or audio intercom system with other devices connected locally to the inventive multimedia network.

In accordance with another embodiment of the invention, the inventive wireless display terminal can be used as a highly portable personal digital assistant. When within the range of its "home" multimedia network, the wireless display terminal acts as a mobile computer monitor and television or video recorder display. Through the remote control of the centralized computer, the wireless display terminal effectively has the computational power of the centralized computer. The inventive wireless display terminal may include on-board intelligence, such as a CPU or microprocessor, to enable it to function as a PDA even when outside the range of the inventive multimedia network. Further, the wireless display terminal can also be used with other wireless networks other than its "home" network.

The wireless display terminal can also have sufficient on-board storage to enable it to download HTML and other documents from network connections such as the Internet. For example, it can be used to download a news site or email from the Internet, a movie or TV show from the home network, etc. The Internet connection can be direct via an on-board modem, or it can be indirect through data transferred from the centralized computer. The onboard storage can be optimized for storing video and audio signals, with the contents of the storage device addressed specifically to enable efficient access to the stored video and audio signals. For example, a text document can be formatted by the centralized computer as a series of video frames and transmitted to the wireless display device. The text document thus, is stored in the same manner as a segment of a movie would be stored. In this way, the inventive wireless display device does not require specific software or onboard processing power to retrieve and display the text document. In a similar manner, Internet web pages or email can be transmitted and stored by the inventive wireless display device. This strategy for transferring and storing content results in a much lower cost wireless display device that will not become obsolete because its processor or operating system is not the latest available.

The inventive wireless display terminal can include a control signal generator for generating control signals that are effective to remotely control the operation of the centralized computer. The control signal generator can also directly control the various appliances and devices in the home through the emission of infrared or other wireless signals, or these appliance and devices can be indirectly controlled via the control of the centralized computer.

BRIEF DESCRIPTION OF THE DRAWINGS

FIG. 4 illustrates an embodiment of the inventive mobile display signal generator and the inventive thin, lightweight, flexible, bright, wireless display;

FIG. 7 is a representation of an embodiment of the inventive thin, flexible, lightweight, bright wireless display manufactured using a microcapsule printer;

FIG. 8 is an exploded view of a conductive coil;

FIG. 9 is an assembled view of a conductive coil;

FIG. 10 is a cross sectional view of two conductive coils;

FIG. 13 illustrates the use of the inventive wireless display device for displaying Internet and intranet content in external network environments, such as schools, airports, airplanes, grocery stores and the like;

FIG. 15 illustrates a configuration of an embodiment of a touch screen wireless remote control device for displaying a same image on the remote control device screen as is shown on a large display connected with the inventive multimedia network;

FIG. 16 shows an inventive wireless display terminal for use within range of a multimedia network identified on the network via addressable handshake exchange, and for use outside the range of the network for use as a stand-alone personal digital assistant, pager, cellular telephone, etc.;

FIG. 18 shows an inventive wireless display terminal connected with a remotely located computer of an inventive multimedia network having multiple computer display local channels;

DETAILED DESCRIPTION OF THE INVENTION

Figure 1:
FIG. 1 illustrates an embodiment of the inventive thin, lightweight, flexible, bright wireless display having components capable of being manufactured by a printing method, showing the simultaneous display of mapped hyperlinked content, a videophone stream and a broadcast TV stream.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

FIG. 1 illustrates an embodiment of the inventive thin, lightweight, flexible, bright wireless display having components capable of being manufactured by a printing method, showing the simultaneous display of mapped hyperlinked content, a videophone stream and a broadcast TV stream. In accordance with the present invention, a thin, lightweight, flexible, bright wireless display is obtained having components capable of being manufactured by a printing method. The present invention enables a low cost, flexible, robust, full color video display to be obtained. This wireless display is capable of receiving multiple display information signals and displaying the simultaneous screens of the received display information in reconfigurable formats. A relatively simple signal receiving and processing circuit, using, for example, a digital signal processor such as those available from Texas Instruments, Texas or Oxford Microdevices, Connecticut, enables multiple video and still image screens to be displayed. An inventive manufacturing method described herein and in the co-owned patent application Ser. No. 10/234,301 entitled "Printer and Method for Manufacturing Electronic Circuits and Displays" enables the inventive wireless display to be fabricated at low cost and with the advantageous features described herein.

As described in more detail herein, a flexible substrate provides a support structure upon which components can be manufactured by a printing method. A display stratum includes light emitting pixels for displaying information. The light emitting pixels are formed by printing a pixel layer of light-emitting conductive polymer. An electronic circuit stratum includes signal transmitting components for transmitting user input signals to a display signal generating device for controlling display information transmitted from the display signal generating device. Signal receiving components receive the display information transmitted from the display signal generating device. Display driving components drive the display layer according to the received display information. A user input stratum receives user input and generates the user input signals. A battery stratum provides electrical energy to the electronic circuit stratum, the user input stratum and display stratum components. The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display stratum and the second display information at a second location on the display stratum. At least some of the components in the battery, display, user input and electronic circuit stratums are formed by printing electrically active material to form circuit elements including resistors, capacitors, inductors, antennas, conductors and semiconductor devices.

Figure 2:
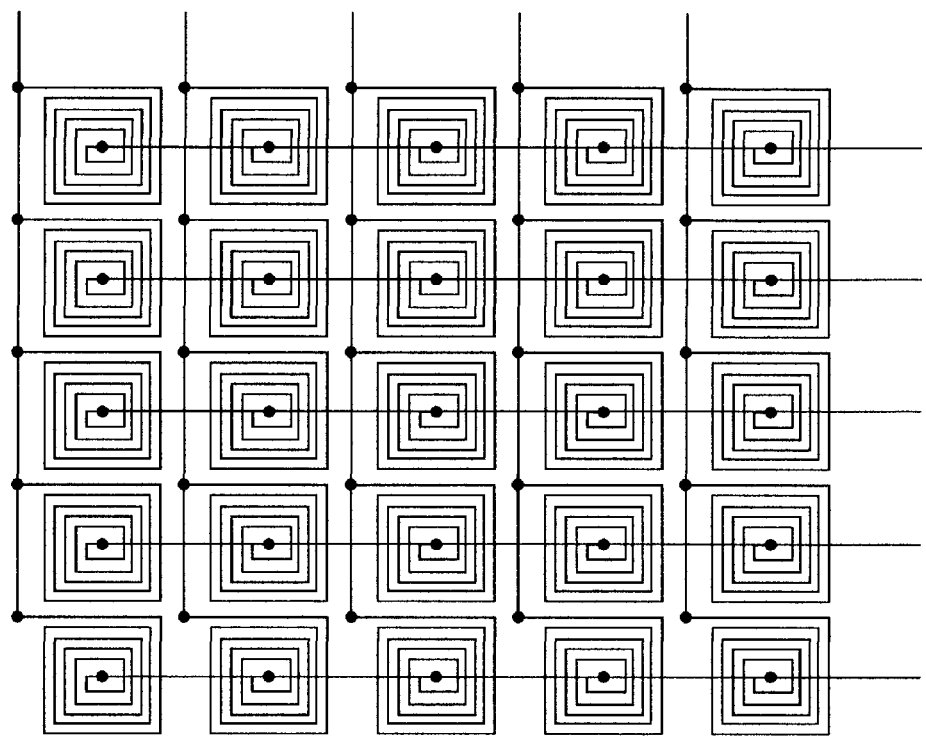
FIG. 2 illustrates a grid of conductive coils which are part of the user input stratum of the inventive thin, lightweight, flexible, bright wireless display.

FIG. 2 illustrates a grid of conductive coils which are part of the user input stratum of the inventive thin, lightweight, flexible, bright wireless display. The user input stratum may comprise a grid of conductive elements each conductive elements for inducing a detectable electrical signal in response to a moving magnetic field. Alternatively, the user input stratum may comprise a touch screen formed by printing pressure sensitive or capacitance sensitive elements on an insulative layer. In any case, the physical location of the user input is determined and control signals are generated and transmitted to remote devices based on the determined physical location. As described in more detail below, by mapping the location of hyperlinks displayed on the inventive wireless display, and correlating the location with hyperlinks mapped by a central computer (if the layout of a wireless display is altered, e.g, the location on the display of a particular screen such as a webpage is moved, the layout information can be transmitted to the display information transmitting device, making possible, for example, the gateway system described herein below).

Figure 3:
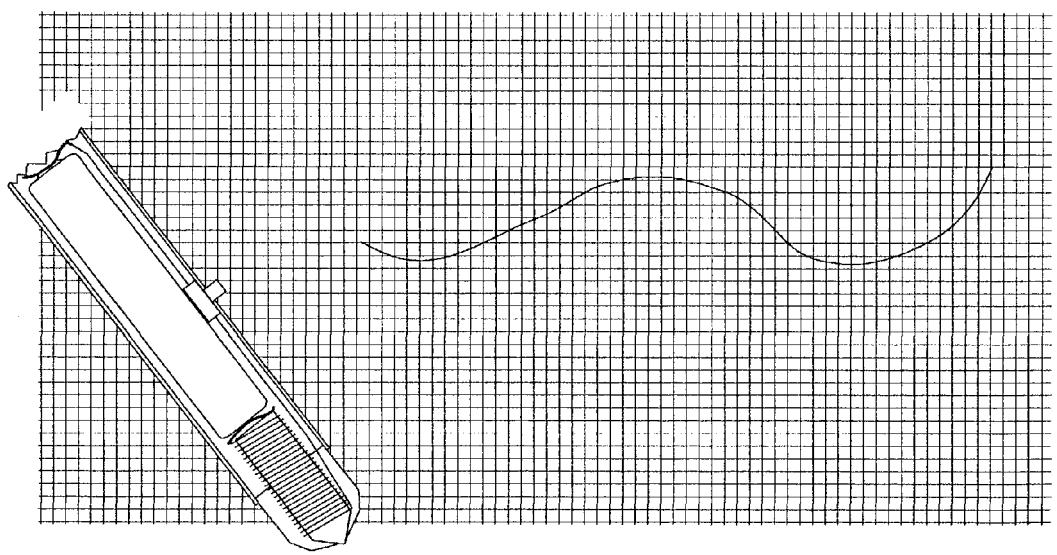
FIG. 3 is an illustration showing a magnetic pen stroke formed on a magnetic detecting grid by an inventive magnetic pen.

FIG. 3 is an illustration showing a magnetic pen stroke formed on a magnetic detecting grid in accordance with the present invention. As shown in FIG. 3, a magnetic pen stroke is detected as induced electrical current within the coils of the user input stratum. This detected movement of the magnetic pen tip enables the location of the user input to be determined. The information regarding the mapping and tracking of the magnetic pen stroke is transmitted wirelessly to the remote computer where handwriting recognition, hyperlink mapping and other useful processing occurs. Also, the inventive wireless display, or the remote computer, can utilize this detected pen stroke to provide feedback to the user by controlling the display so that a visible representation of the movement of the pen stroke is shown.

FIG. 4 illustrates an embodiment of the inventive mobile display signal generator and the inventive thin, lightweight, flexible, bright, wireless display. The inventive wireless display may be used, for example, as a digital newspaper or magazine. To keep the display thin, low cost and robust, the majority of the processing, networking, data storage and other functions typically performed by a display device (such as a lap top computer) are performed remote from the inventive wireless display. Thus, in accordance with the present invention, a system is provided that uses the computational capabilities of a remote device to create and control the formatting and content of information shown on the display. The user input stratum can be formed as a pressure sensitive or capacative touch screen. An antenna may be formed by printing a conductive member along with the electronic circuit stratum. The antenna or antennas are dimensioned depending on the frequency and reception or transmission characteristics needed.

As described herein, a central computer, an A/V system or a gateway device may be the source of the display signals. Also, a stand-alone self-contained mobile processing device, such as the one shown in FIG. 4 may be utilized. This mobile processing device communicates wirelessly with the inventive display and may be, for example, carried in a briefcase, placed on a desk, or carried in the pocket of the user. The mobile processing device may include a wired or wireless networking system for connecting to, for example, the Internet, hard drive for storing, for example, a movie, text or other data, a receiver and transmitter for communicating with the display, a computer processor and an onboard rechargeable battery.

Figure 5:
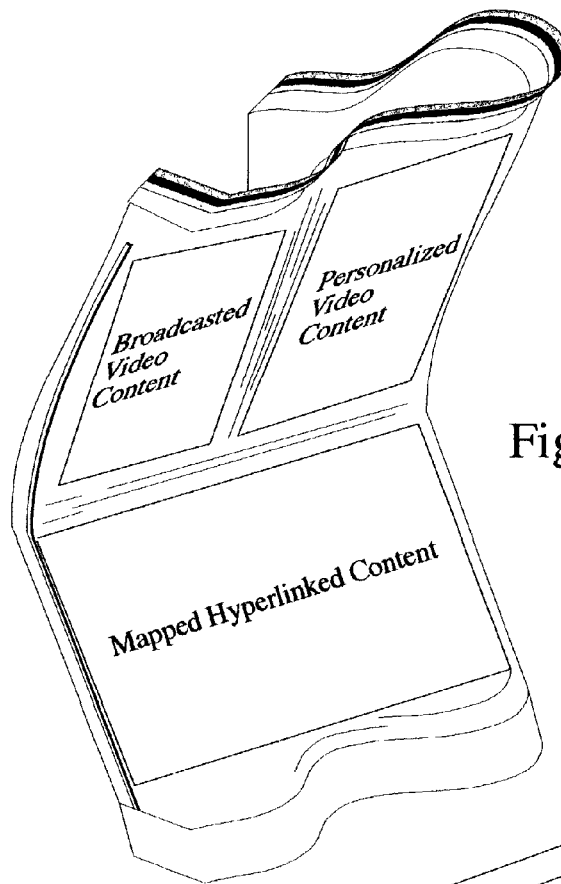
FIG. 5 illustrates the inventive thin, lightweight, flexible, bright, wireless display schematically showing the simultaneous display of three received display signal.

FIG. 5 illustrates the inventive thin, lightweight, flexible, bright, wireless display schematically showing the simultaneous display of three received display signal The inventive thin, lightweight, flexible, bright, wireless display includes a flexible substrate to provide a support structure upon which components can be manufactured by a printing method. As described herein, a unique and effective method for transmitting display information to a single or multiple displays enables such displays to not have to have substantial onboard storage or processing power. In accordance with this aspect of the invention, the energy drain, bulk, weight and cost normally associated with such devices is avoided, and the durability and convenience of the display is increased. Further, as shown schematically in FIG. 5, multiple streams of display information can be simultaneously received and displayed. For example, broadcast video content such as a television program may be shown at a first portion of the display, personalized video content, such as a videophone conversation may be shown at a second portion and a web page, including mapped hyperlink content, may be shown at a third portion. Most of the processing, networking, signal tuning, data storage, etc., etc., that it takes to create such a set of displayed content streams is not performed by the inventive wireless display. Other devices, such as a centralized computer, A/V or gateway device perform these functions thus, allowing the opportunity for the inventive display to have tremendous mobility and convenience.

Figure 6:
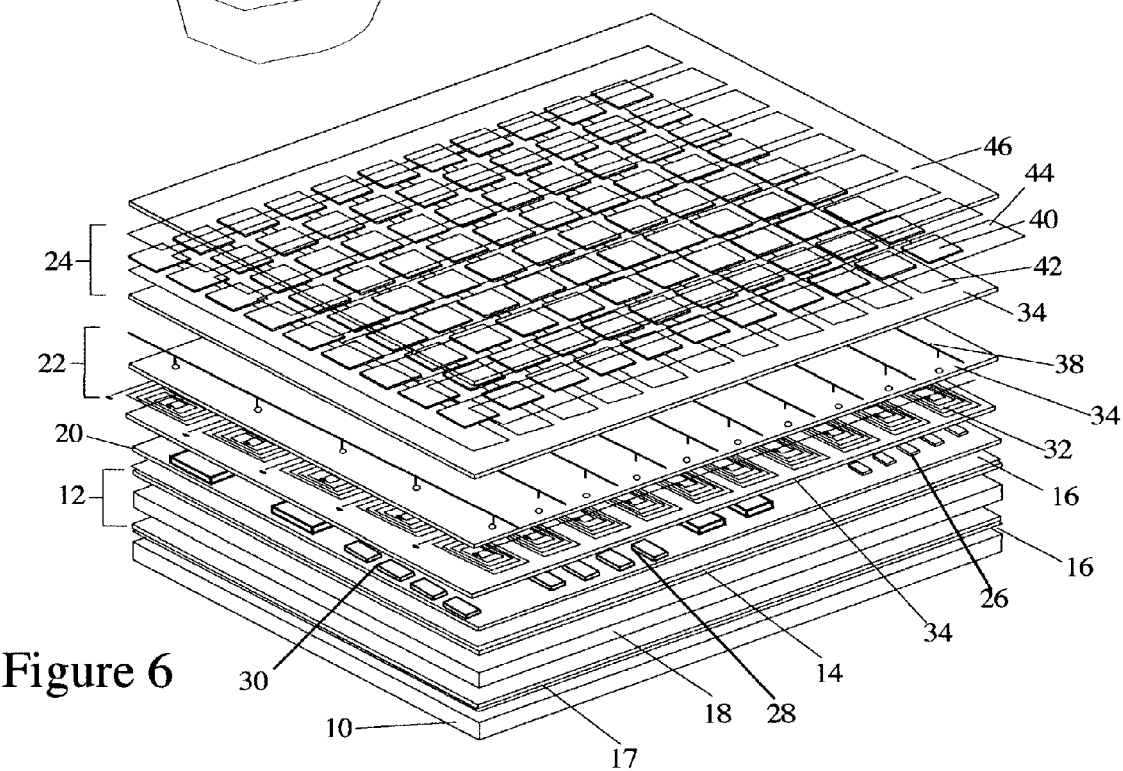
FIG. 6 is a schematic representation of the stratum of the inventive thin, lightweight, flexible, bright, wireless display.

FIG. 6 illustrates some of the layers forming the inventive thin, lightweight, flexible, bright, wireless display. A flexible substrate 10 provides a durable, insulative and protective base upon which the various battery, input, display and electrical circuit layers are formed. The flexible substrate 10 may be, for example, a plastic sheet comprised of nylon, polyethylene, or other suitable material. A flexible battery 12 is formed upon the flexible substrate 10. The large surface area of the flexible substrate 10 allows a battery to be formed which has adequate energy storing capacity and is very thin. As described herein, the flexible battery 12 may be formed using the inventive microcapsule printing method, or a flexible substrate and battery support sheet may be formed by laminating the various component sheets together to form the support sheet upon which the display and electronic circuit is formed. In general, the flexible battery in accordance with the present invention comprises a cathode layer 14, which may be formed of a cathode film. The cathode layer 14 may be comprised of a high-purity manganese dioxide ($MnO_2$) material. A current collector 16 formed of a metal foil or screen or mesh or equivalent is provided adjacent to the cathode layer 14. This current collector 16 forms the positive lead of the battery. An anode layer 17 is comprised of an anode film having a current collector 16 disposed adjacent to it. The anode layer 17 may be comprised of a lithium-containing material. A current collector 16 forms the negative lead of battery. Between the anode layer 17 and cathode layer 14 is an electrolyte layer. The electrolyte layer 18 may be a microcapsule comprised of a highly conductive electrolyte in a polymer matrix. The electrolyte layer 18 may be formed by impregnating a polymer with a liquid electrolyte, or using the inventive printing method, by microencapsulating a liquid electrolyte internal phase within a field attractive microcapsule shell.

FIG. 6 is a schematic representation of the stratum of the inventive thin, lightweight, flexible, bright, wireless display. The inventive display is inexpensive to manufacture, yet robust and highly effective. A flexible substrate 10 provides a structure on which to form the various stratum that make up the display, and allows for a display with high degree of flexibility and durability. The flexible substrate 10 may be, for example, plastic, paper or coated paper, or other suitable material.

A battery stratum 12 provides electrical energy to the electronic circuit stratum 20, user input stratum 22 and display stratum 24 components. The battery stratum 12 may comprise a first current collector 16 layer printed on a flexible insulative substrate which may be the flexible substrate 10. One of an anode layer 17 or a cathode layer 14 is printed on the first current collector 16 layer. A microencapsulated electrolyte layer 18 is printed on the anode layer 17 or the cathode layer 14. The other one of the anode layer 17 or the cathode layer 14 is printed on the electrolyte layer 18 and a second current collector 16 layer printed on this anode layer 17 or the cathode layer 14. The dimensions of the battery stratum 12 can be substantially the entire surface area of the wireless display. Thus, a very efficient and thin battery can be formed. Since the battery will create a signal shielding effect, it may be desirable to use less than the total surface area available for forming the battery, and locate an antenna such that it can receive signals from most directions. Alternatively, it may be advantageous to utilize the shielding and signal reflection capabilities to create directionality of the received and/or transmitted signals. Further, the battery stratum 12 may be comprised of multiple layers to increase the storage density and tailor the electrical characteristics of the battery.

The inventive wireless display also includes an electronic circuit stratum 20. The components of the electronic circuit stratum 20 may be formed using a printing method or may be formed using other techniques such as surface mount circuit assembly or a combination depending on the electronic components and the circuit design. The electronic circuit stratum 20 includes signal transmitting components 26 for transmitting user input signals. These user input signals are used to control remote devices such as computers, A/V equipment, videophone devices, appliances, household lighting, etc. The user input signals may be transmitted directly to the device being controlled, or, as described herein, may be received by a central device, such as a computer, and then the computer used for controlling the device.

An important aspect of the present invention is the ability to provide a thin, lightweight, bright wireless display device that is low cost and easy to manufacture. Typically, a mobile display device, such as a laptop computer or webpad, requires substantial on-board processing power to receive, for example, a wireless modem signal connected to the Internet and display webpages. It is an object of the present invention to completely avoid the need for such processing power at the display, thereby reducing cost, size, battery consumption and increase durability and effectiveness. Therefore, in accordance with the present invention, signal receiving components 28 are included in the electronic circuit stratum 20 for receiving display information, and display driving components 30 are included for driving the display layer according to the received display information. As described herein, the signal receiving components 28 consist of devices such as RF antenna and receiver circuit, much or all of which can be formed by creating a circuit of electronic components formed by a printing method, such as the one described in the above referenced patent application Ser. No. 10/234,301 entitled "Printer and Method for Manufacturing Electronic Circuits and Displays".

The inventive thin, lightweight, bright, wireless display also includes a user input stratum 22 for receiving user input and generating the user input signals. The user input stratum 22 may be a grid of conductive coils 32 that can be formed by a printing method by printing a conductive material, such as a conductive polymer.

Various printing methods are adaptable to form the components of the inventive wireless display, including inkjet printing, or the inventive laser, microcapsule, etc., printing techniques described in the above mentioned co-owned patent application Ser. No. 10/234,301 entitled "Printer and Method for Manufacturing Electronic Circuits and Displays". The conductive coils 32 are effective for generating an electrical current when a magnetic field passes over the coil. A detection circuit (not shown) detects the location of the induced electrical current (as in a conventional touch screen input device) and thus, locates the user input.

The user input stratum 22 may comprise a grid of conductive elements printed on an insulative layer 34. The conductive elements are for inducing a detectable electrical signal in response to a moving magnetic field. The moving magnetic field is created by, for example, passing a magnetic pen tip over the surface of the inventive wireless display. The location of the conductive elements having the induced magnetic field enables the user input to be mapped. This mapped input can be transmitted to a central computer device (as described herein) to enable hyperlink access of Internet based content, handwriting recognition, drawings, highlighting text, etc. FIG. 8 is an exploded view of a conductive coil 32. FIG. 9 is an assembled view of a conductive coil 32; and FIG. 10 is a cross sectional view of two conductive coils 32. Each of the conductive elements may be formed in the shape of a coil terminating in an x-electrode 36 and a y-electrode 38 end, with a grid of such coils 32 comprising the user input stratum 22. The formation of the coil grid by the inventive printing method requires the buildup of the conductive coil structure on an insulative support 34, which may be a sheet or may be a layer of printed insulation. As shown in FIG. 10, insulative material 34 may be printed between the conductive portions of the coils 32 to create a flat top surface upon which another insulative layer (sheet or printed) is applied. On top of this insulative layer 34, a top electrode layer 38 is formed to complete the coil grid. A though-hole in the insulative layer allows the top electrode 38 to be electrically connected with the printed coil.

Referring again to FIG. 6, a display stratum 24 comprising light emitting pixels 40 for displaying information is supported by the substrate. The display stratum 24 is preferably made using a printer, such as the printer and printing method taught in co-owned U.S. patent application Ser. No. 10/234,301 entitled "Printer and Method for Manufacturing Electronic Circuits and Displays", filed concurrently herewith, the disclosure of which is incorporated by reference. The display stratum 24 may be formed over other layers of the inventive wireless display. These other layers may be formed by a printing manufacturing method, or they may be formed by other means. For example, all or parts of the battery stratum 12 described herein may be formed by laminating sheets of appropriate materials such as anode, cathode, charge collectors and electrolyte layers.

The light emitting pixels 40 of the display stratum 24 may be formed by providing an insulative layer 34, such as a sheet of polymer sheet material laminated or printed on a layer of the inventive display. An x or y-electrodes layer 42 comprising lines of a conductive material is formed over the insulative layer, preferably by printing the conductive polymer onto the insulative layer 34. A pixel layer of light-emitting conductive polymer islands 40 is printed over the y-electrode layer 42. A y or x-electrodes layer 44 comprising lines of a transparent conductive material is formed over the pixel layer.

The display stratum 24 may include printed conductive leads connected with each light emitting pixel for applying the electrical energy selectively to each light emitting pixel under the control of the display driving components. The signal receiving components 28 may include first radio frequency receiving components for receiving a first display signal having first display information carried on a first radio frequency and second radio frequency receiving components for receiving a second display signal having second display information carried on a second radio frequency. The display driving components 30 may also include signal processor components, such as a DSP, for receiving the first display signal and the second display signal and generating a display driving signal for simultaneously displaying the first display information at a first location on the display stratum 24 and the second display information at a second location on the display stratum 24. Using this construction, a display signal may be received from, for example, a computer located in one room in a house, and a second display signal received from, for example, a television set top box located in another room in the house. The information carried in the two display signals can be simultaneously displayed, enabling, for example, web browsing and TV viewing at the same time on the inventive wireless display. Further, the inventive wireless display may be constructed so that three or more such signals may be received and displayed simultaneously.

The display stratum 24 may be formed so that three layers of pixel elements are formed one on top of the other. Each layer being comprised of OLED pixels 40 that generate a colored light (as in the pixels 40 of a conventional color television). A full color display is obtained by controlling the on-off state and/or light intensity of each pixel 40. A transparent protective substrate 46 may be provided over the display stratum 24, the protective substrate 46 may be, for example, a clear, durable, flexible polymer.

In accordance with the present invention, and as described in greater detail in the above-mentioned co-owned U.S. patent application Ser. No. 10/234,301 entitled "Printer and Method for Manufacturing Electronic Circuits and Displays", at least some of the components in the electronic circuit stratum 20 are formed by printing electrically active material to form circuit elements including resistors, capacitors, inductors, antennas, conductors and semiconductor devices. This allows for a very adaptable, efficient and effective manufacturing process, and enables the inventive device to be realized at a low cost.

FIG. 7 is a representation of an embodiment of the inventive thin, flexible, lightweight, bright wireless display manufactured using a microcapsule printer. The drawing illustrates the buildup of microcapsule layers represented by round microcapsule elements. Of course, in practice, these layers will be developed and the microcapsules ruptured. In the case of laser toner, the microcapsules will be melted and ruptured. In the case of a microcapsule printer, the microcapsules will most likely be ruptured by pressure rollers or heat.

In accordance with the present invention, a thin, lightweight, flexible, bright, wireless display is obtained having components capable of being manufactured by a printing method. A flexible substrate 10 provides a support structure upon which components can be manufactured by a printing method. A display stratum 24 comprising light emitting pixels is provided for displaying information. The light emitting pixels are formed by printing a pixel layer 40 of light-emitting conductive polymer. The display stratum 24 includes printed conductive leads 42,44 associated with each light emitting pixel for applying the electrical energy selectively to each light emitting pixel under the control of the display driving components, the light emitting pixels being formed by providing an insulative layer 34, printing a y-electrodes layer 42 comprising lines of a conductive material formed over the insulative layer 34, printing a pixel layer of light-emitting conductive polymer islands 40 over the y-electrode layer 42, and printing an x-electrodes layer 44 comprising lines of a transparent conductive material over the pixel layer 40.

An electronic circuit stratum 20 includes user input mapping components for receiving user input signals and determining a physical location on the display at which the user input signals are received. The user input mapping components generate mapped user input signals. For example, the components of an electrode signal detecting circuit, such as that used by a touch screen device, can be utilized for detecting and mapping the user input signals received in response to the movement of a magnetic pen tip over the input grid. Signal transmitting components transmit the mapped user input signals as wireless information signals from the inventive wireless display device. Signal receiving components receive display information. The signal receiving components may include first radio frequency receiving components for receiving a first display signal having first display information carried on a first radio frequency and second radio frequency receiving components for receiving a second display signal having second display information carried on a second radio frequency. The display driving components include signal processor components for receiving the first display signal and the second display signal and generating a display driving signal for simultaneously displaying the first display information at a first location on the display stratum 24 and the second display information at a second location on the display stratum 24.

The signal transmitting and signal receiving components include well known electronic circuit elements such as antennas, resistors, inductors, capacitors, and other RF circuit devices, represented by electronic components 27. At least some of these devices, as well as the components of the other stratum of the inventive wireless display, may be fabricated directly using the inventive printer and printing method described in the above-mentioned co-owned patent application Ser. No. 10/234,301 entitled "Printer and Method for Manufacturing Electronic Circuits and Displays". Display driving components drive the display layer according to the received display information. These display driving components consist of well-known circuitry, such as the driver circuit of a conventional LCD screen. However, a conventional LCD screen uses pixels comprised of a liquid crystal shutter to allow selective passage of backlighting. In accordance with the present invention, an organic light emitting element as pixels. Since each pixel element emits its own light when driven, there is no need for backlighting, and the overall circuit complexity, cost and weight is reduced as compared to the LCD technology.

A user input stratum 22 receives user input and generates the user input signals. The user input stratum 22 comprises a grid of conductive elements 32 printed on an insulative layer, said conductive elements 32 being for inducing a detectable electrical signal in response to a moving magnetic field A battery stratum 12 provides electrical energy to the electronic circuit stratum 20, user input stratum 22 and display stratum 24 components. The battery stratum 12 comprises a first current collector layer 16 printed on a flexible insulative substrate which may be the flexible substrate 10. An anode layer 17 is printed on the first current collector layer. An electrolyte layer 18 is printed on the anode layer 17. A cathode layer 14 is printed on the electrolyte layer 18 and a second current collector layer 16 is printed on the cathode layer 14. In accordance with the present invention, many of the components in the inventive wireless display are formed by printing electrically active material to form circuit elements including resistors, capacitors, inductors, antennas, conductors and semiconductor devices.

Specifically, with regard to the battery stratum 12 the large surface area of the flexible substrate 10 allows a battery to be formed having adequate energy storing capacity and very thin. As described elsewhere herein, a flexible substrate and battery support sheet may be formed by laminating the various component sheets together to form the support sheet upon which the display and electronic circuit is formed. In accordance with this aspect of the present invention, the flexible battery is formed using the inventive field attractive microcapsule printing method. However, it is noted that other printing methods may also be used in accordance with the formation of the inventive flexible battery, such as inkjet printing. In the case of inkjet printing the microcapsules containing the constituent parts of the inventive battery are dispersed within a liquid and sprayed onto the flexible substrate 10 in the inkjet printing method. In accordance with the present invention, the battery is obtained by forming layers of microencapsulated electrically active materials which make up the components of the functioning battery. A cathode section is formed by forming a first cathode microcapsule layer. The encapsulated cathode material may be comprised of a high-purity manganese dioxide ($MnO_2$) internal phase contained within a polymer shell. A first battery lead is formed of a metal foil or screen or mesh or equivalent is provided adjacent to the first cathode microcapsule layer. A second cathode microcapsule layer is formed on top of this battery lead. An anode section is formed by forming a first anode microcapsule layer. The encapsulated anode material may be comprised a lithium-containing material internal phase contained within a polymer shell. A second battery lead is formed of a metal foil or screen or mesh or equivalent and is provided adjacent to the first anode microcapsule layer. A second anode microcapsule layer is formed on top of this battery lead. Between the anode section and cathode section is an electrolyte layer. The electrolyte layer may be a highly conductive electrolyte in a polymer matrix. The electrolyte layer may be formed by microencapsulating a liquid electrolyte internal phase within a field attractive microcapsule shell. Each microcapsule layer may be cured or ruptured during each layer forming step, or particularly in the case of pressure or heat rupturable microcapsules, the battery component microcapsule layers may be cured or ruptured all together after the formation of the top most layer. Using this method, a thin, flexible, lightweight power source is provided using the inventive microcapsule printing method. Similar to the structure described elsewhere herein, structural material-filled through-holes may be formed using field attractive microcapsules containing a suitable resin, polymer or other suitable substance to add strength and prevent delamination of the flexible battery component stack.

Figure 11:
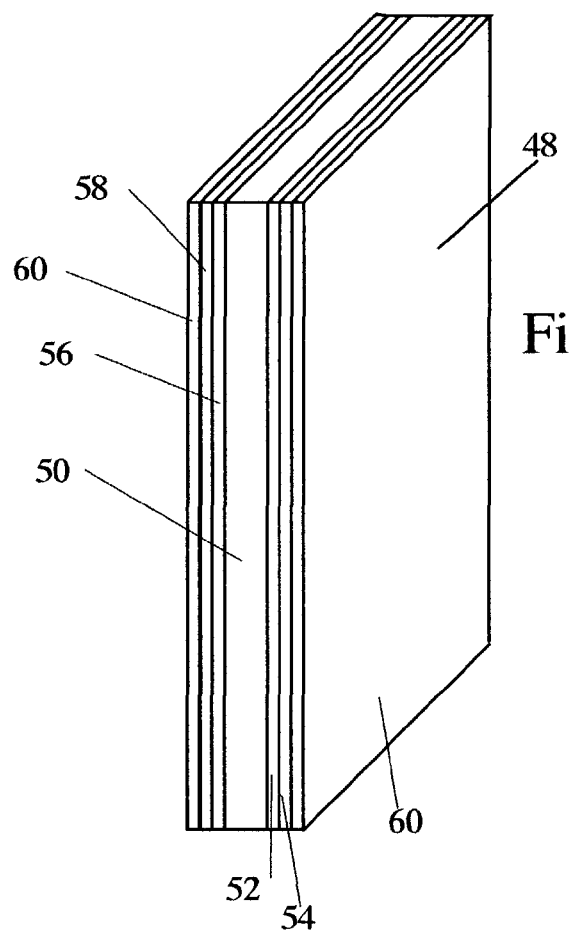
FIG. 11 is an isolated enlarged cross sectional view of a flexible rechargeable battery support sheet used in accordance with the present invention.

FIG. 11 is an isolated enlarged cross sectional view of a flexible rechargeable battery support sheet 48 used in accordance with the inventive method of printing an electronic circuit described herein. The flexible rechargeable battery support sheet 48 is used, in accordance with one aspect of the present invention, as a support sheet upon which can be constructed a thin, lightweight, bright and flexible color display. The rechargeable battery components may comprise a rechargeable plastic lithium-ion battery. The battery components comprise a plastic member 50, which is formed by impregnating a plastic with a liquid electrolyte. The resulting plastic electrolyte member 50 is typically about 50% liquid and cannot leak. The plastic electrolyte member 50 is sandwiched between a positive plastic electrode 52 (which may contain lithium manganese oxide) melded to an aluminum mesh 54 and a negative plastic electrode 56 (which may contain carbon) melded to a copper mesh 58. In accordance with the present invention, a structural support substrate 60 is disposed adjacent to at least one side of the rechargeable battery components. The structural shell substrate 60 may be, for example, a durable and flexible material, such as fiberglass, plastic or other suitable material. Thus, in accordance with the present invention, the flexible rechargeable battery support sheet 48 can be used to provide a self-contained energy source for powering the circuit elements and the display elements of the thin, lightweight, bright and flexible color display described herein. In this case, the flexible rechargeable battery support sheet 48 is provided as the substrate upon which the rest of the inventive display is formed. As will also be described herein, all or some of the component parts that make up the flexible rechargeable battery may be formed by the inventive microcapsule printing method. In this case, the energy source for the inventive flexible rechargeable display is manufactured using the same inventive printing technique as some or all of the other electronic and display components of the inventive thin, lightweight, bright and flexible color display. The resulting display is very efficient since the supporting elements of the display are also used to store the electrical energy needed to power the electronic and display components, thereby saving considerable weight and maximizing space. Electrode lands and conductive through holes, as needed (not shown) are provided for connecting the battery to the rest of the electronic components.

Figure 12:
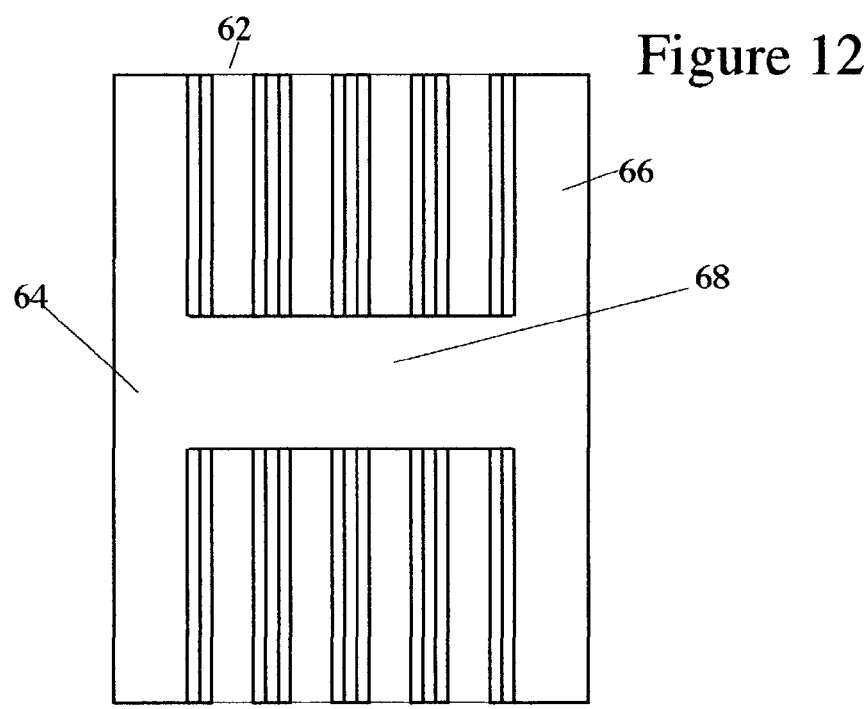
FIG. 12 is a cross section of a multiple cell support sheet formed from the inventive rechargeable battery structure shown in FIG. 11.

FIG. 12 is a cross section of a multiple cell support sheet formed from the inventive rechargeable battery structure shown in FIG. 11. A stack of flexible battery components 62 are sandwiched between an inner support substrate 64 and an outer support substrate 66. The support substrates provide durability and protection of the components of the display, as well as electrical insulation between the battery elements and the other electronic circuit components. Each of the adjacent flexible battery component stack members share the copper or aluminum mesh with its neighbor. Structural material-filled through-holes 68 add strength and prevent delamination of the flexible battery component stack 62. The structural material may be, for example, a resin, polymer, or other suitable substance.

Figure 13:
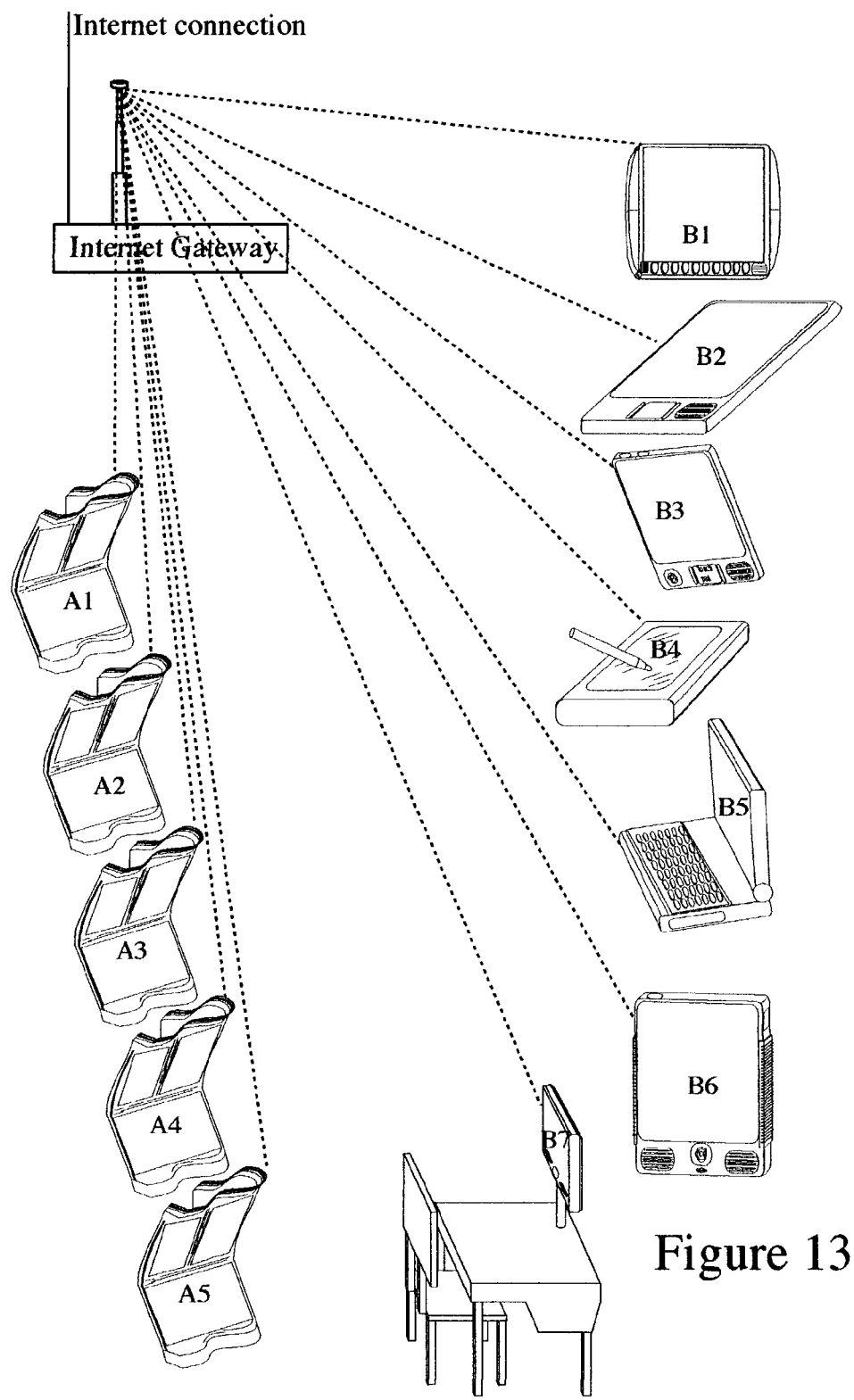

FIG. 13 illustrates the use of the inventive wireless display device for displaying Internet and intranet content in external network environments, such as schools, airports, airplanes, grocery stores and the like. Each wireless display terminal logs into the network by a handshake (like a cellular telephone). The wireless display terminal is then allocated a specific "slice" of the available spectrum and transmission timing—like a mainframe communicating with a bunch of users on dumb terminals. For data such as Internet data, a single frame or portion thereof (webpage) is all that needs to be transmitted to each user before another user can be allocated the transmission "space". Each user is given a sync code from the gateway so that his wireless display terminal knows when to expect the next frame (e.g., webpage) reception (if there is one ready for him) and so that the gateway knows when to expect data (such as hyperlink clicks) from the user. The webpages for the users are buffered at the gateway. Preferably, a full page is received and buffered before it is transmitted to the user. It may be transmitted as a single video frame, with the hyperlinks mapped in the manner described herein. The user's hyperlink selection is transmitted to the gateway in the form of an RF signal containing the grid coordinate which is compared with the hyperlink map to determine which hyperlink has been clicked. The grid coordinate can be determined from a "standard" origin, such as the top left corner of the webpage (the grid can be resized if the page is resized to accommodate page scrolling and resizing). The data that is transmitted between the wireless display terminal display and the gateway consists of video frame-type pages from the gateway to the wireless display terminal and hyperlink grid coordinates from the wireless display terminal to the gateway. Other data, such as handshake information can be included with the transmissions to ensure that the gateway "knows" which wireless display terminal is communicating with it and so that the wireless display terminal "knows" that it is its data being received. The handshake information can also be used to enable more efficient communication between the gateway and multiple users—optimizes idle time because data can be sent or received out of sync order. Can also provide prioritization of communication allowing, for example, a preferred wireless display terminal to gain gateway access ahead of others. Otherwise, if a frame is not ready for that user, then he has to wait until his next "sync time" until he can get another. The inventive wireless display terminals are capable of analog and digital reception. The analog channels may be used for "public" data, or when receiving multimedia signals in the home. The digital reception may be used for encrypted data reception when in the public network, to allow private web browsing, email, etc. through the gateways.

Figure 14:
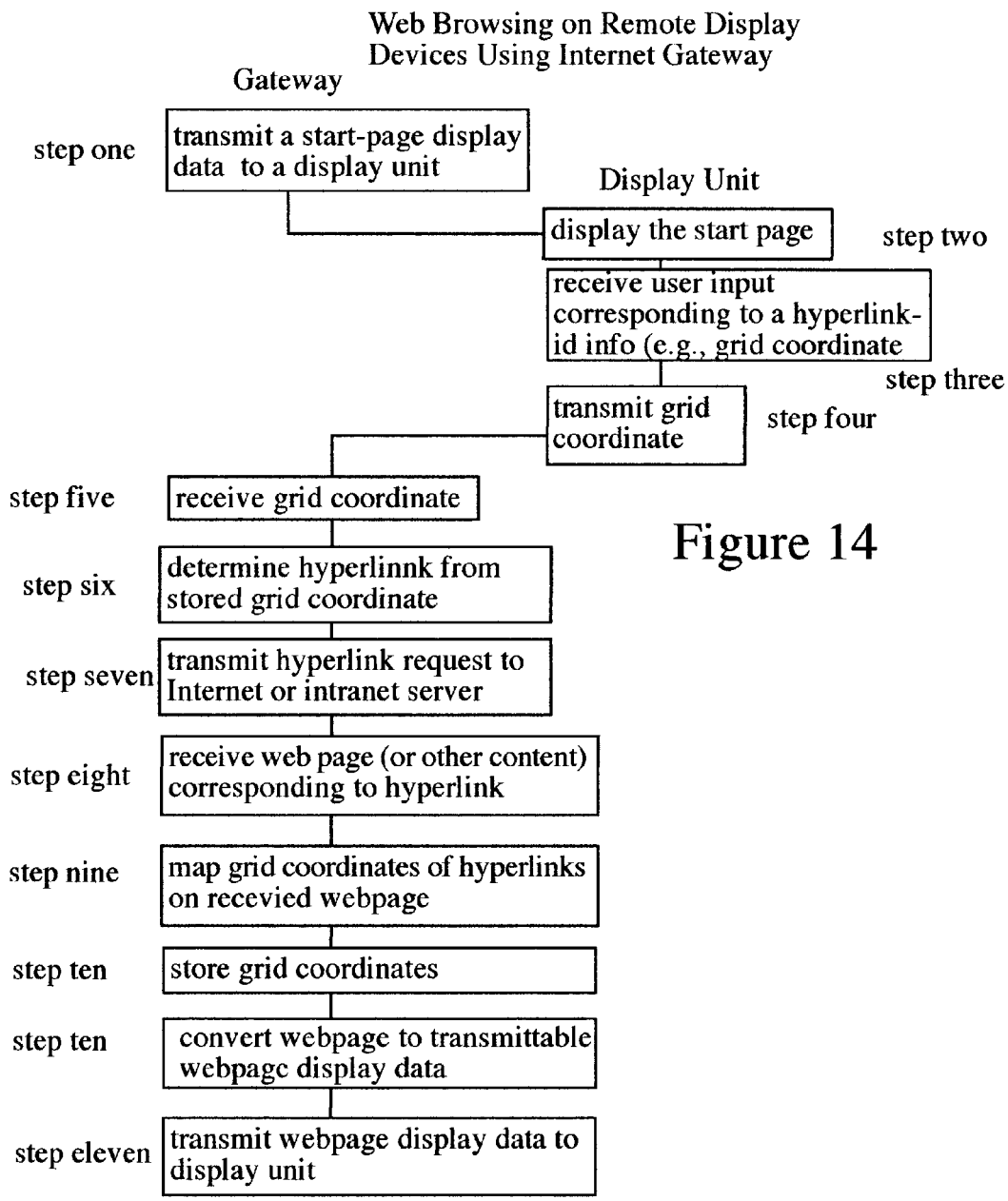
FIG. 14 is a flowchart showing the steps of transmitting, receiving and displaying Internet and intranet content on networked display devices.

FIG. 14 is a flowchart showing the steps of transmitting, receiving and displaying Internet and intranet content on networked display devices. A start page is broadcasted from the gateway for reception by display devices used by users located within the range of the gateway network (can be wireless or wired broadcast). The start page may be, for example, a web browser "portal" page stored on the gateway that is the first page transmitted to any display unit when it begins an Internet session or otherwise wishes to receive information (television channels, intranet content, closed-circuit video, etc.) from the gateway source. The start page can include links to intranet sites (for example, in an airport environment, it may include flight information, terminal map, driving directions, rental car and airline information, etc.). Some of the intranet data can be refreshed from the Internet connection—i.e. traffic and weather reports. Since this type of data is likely to be frequently accessed by different user, it can be cached as part of the intranet data, and periodically refreshed, thus, obviating the need for individual access to certain Internet pages. The Internet-based alert system described herein can be employed to ensure that "breaking" news from the Internet is quickly available as intranet data. The start-page can be transmitted on a "public" channel—available simultaneously to all the display device in the network. Once a display device sends it's first hyperlink request—i.e., the grid coordinates of one of the hyperlinks on the start page, along with its identifying handshake—a "private" connection channel is formed between the display device and the gateway along the lines described herein, or using known technology such as that employed by cellular telephone networks. A location, such as an airport, may have multiple gateways disposed at locations throughout the airport terminals. As a user moves about the terminals, the display unit is handed off between the gateways. Also, frequency hopping, spread spectrum, encryption, or other suitable techniques, can be used to transmit secure webpage or other content data. The webpage data can be transmitted as analog information, rather than digital, since there is little opportunity for digital compression in the moving picture sense, and thus, digital transmission may be too bandwidth intensive to accommodate numerous simultaneous users. The display device receives and converts the analog signal (for example, a composite video signal) containing a frame of a video signal as a web page. Thus, using the NTSC TV standard as a guide, 6 MHz of analog bandwidth can transmit about 30 webpages/second—allowing for the accommodation of many users from a single gateway—particularly if multiple analog transmission channels are available. HDTV or computer monitor-type resolutions may require additional bandwidth as compared with the conventional television-type resolution. Sensitive data, such as email, may need special processing to keep the email private if it is transmitted as an analog video frame. Or, some data may be transmitted as digital, more bandwidth intensive, signals to enable digital encryption and other privacy techniques to be employed.

Throughout this application, where appropriate, the term "recorder" is intended to include any video, audio and/or data recording devices, such as DVD, hard drive and other random access and linear recording devices, and recording medium is intended to include the various recording media utilized by the same.

In accordance with one aspect of the present invention, "local channels" are carried by carrier frequencies that have been allocated as the television channel frequency spectrum. In accordance with other aspects, the "local channels" are also, or exclusively, carried by carrier frequencies that have been allocated by the FCC or other governmental body as the television channel frequency spectrum. Throughout this application, "user-profile" is intended to include data collected or otherwise determined corresponding to the viewing habits, on-line habits, demographics or other particulars of a specific user or a group including a specific user of the inventive devices and methods. An Internet-based service can be provided that creates programming and other content suggestions that correspond with a statistical analysis of the user-profile.

FIG. 15 illustrates an example of the usefulness of the present invention. In this case, an embodiment of a touch screen wireless remote control device is used for displaying a same image on the remote control device screen as is shown on a large display connected with the inventive multimedia network. Thus, a mobile wireless display device can be easily utilized for controlling the viewing on a larger stationary home theater or television.

FIG. 16 shows an inventive wireless display terminal for use within range of a multimedia network identified on the network via addressable handshake exchange, and for use outside the range of the network for use as a stand-alone personal digital assistant, pager, cellular telephone, etc.

Figure 17:
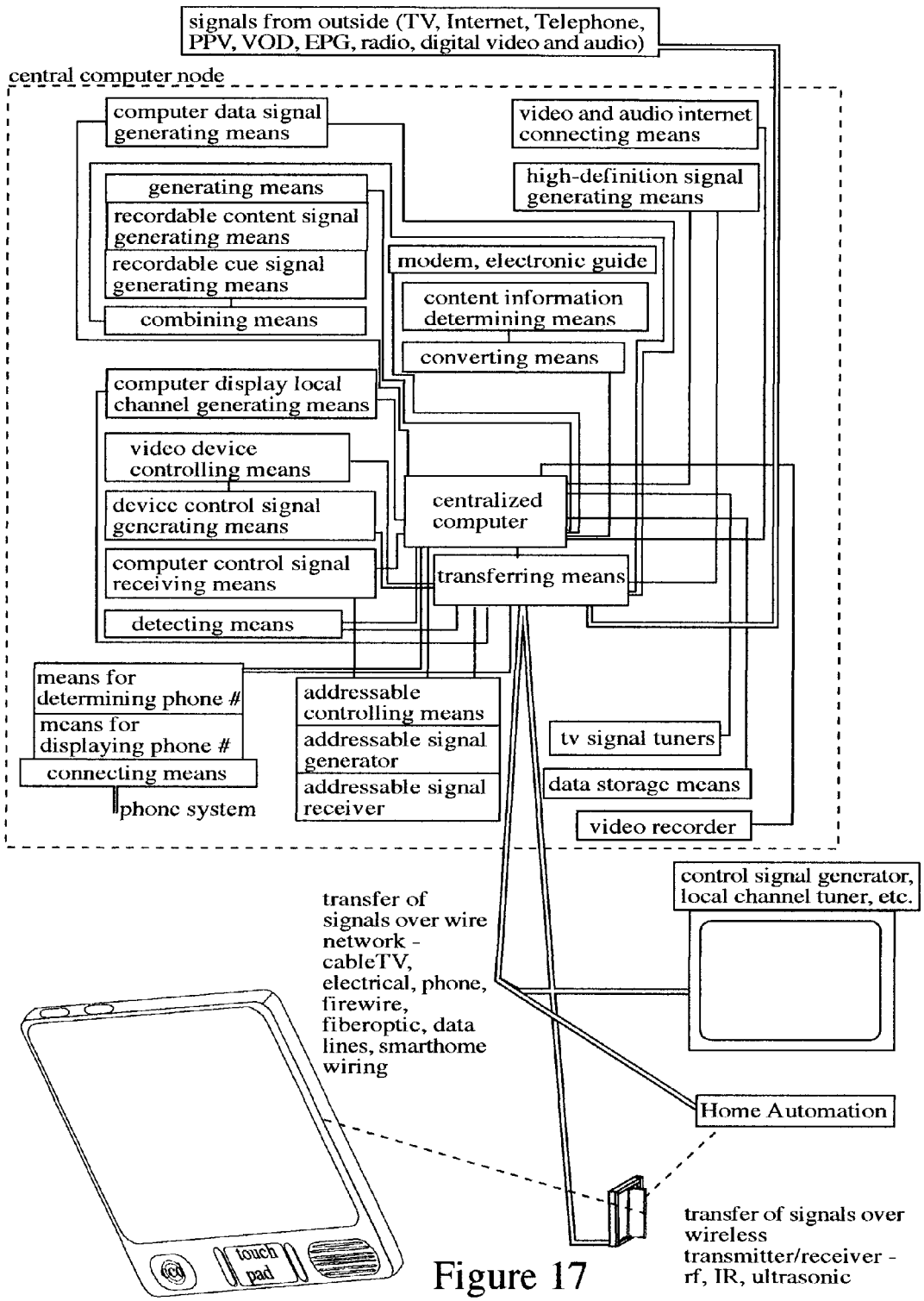
FIG. 17 shows an inventive wireless display terminal in use for controlling devices connected with the multimedia network through control signals communicated via a remotely located computer.

FIG. 17 shows an inventive wireless display terminal in use for controlling devices connected with the multimedia network through control signals communicated via a remotely located computer. A modern desktop computer includes a relatively expensive and highly effect processor that can be utilized for many applications. Typically, a desktop computer is used for tasks such as word processing, spreadsheets, Internet access, and the like. The present invention enables a desktop computer to become a central source of control signals and video and audio information, using the hard wire connections (e.g., Internet connection) and FIG. 18 shows an inventive wireless display terminal connected with a remotely located computer of an inventive multimedia network having multiple computer display local channels.

Figure 19:
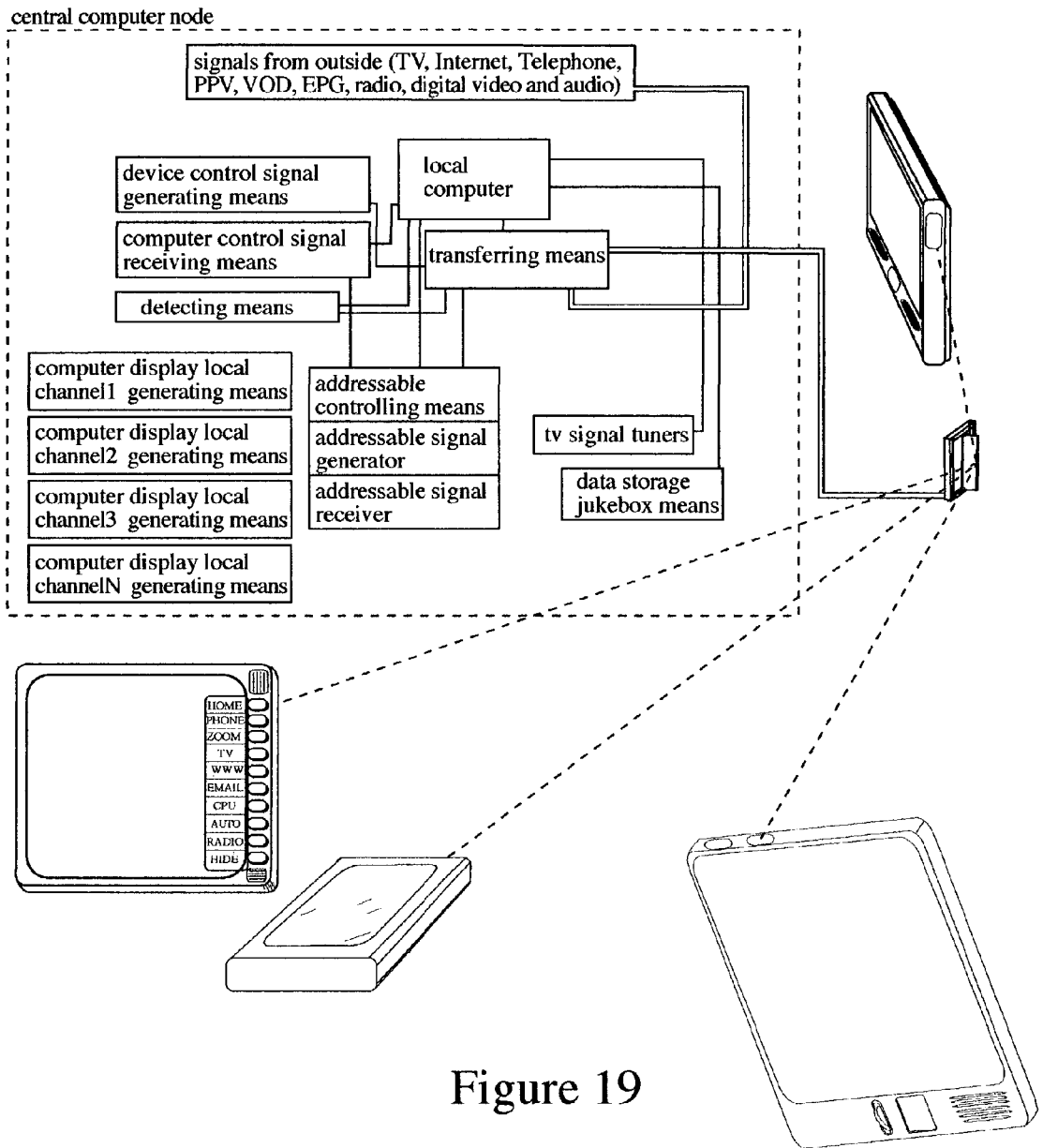
FIG. 19 shows a variety of wireless display terminals connected and communicating with each other through control signals via a remotely located computer.
Figure 20:
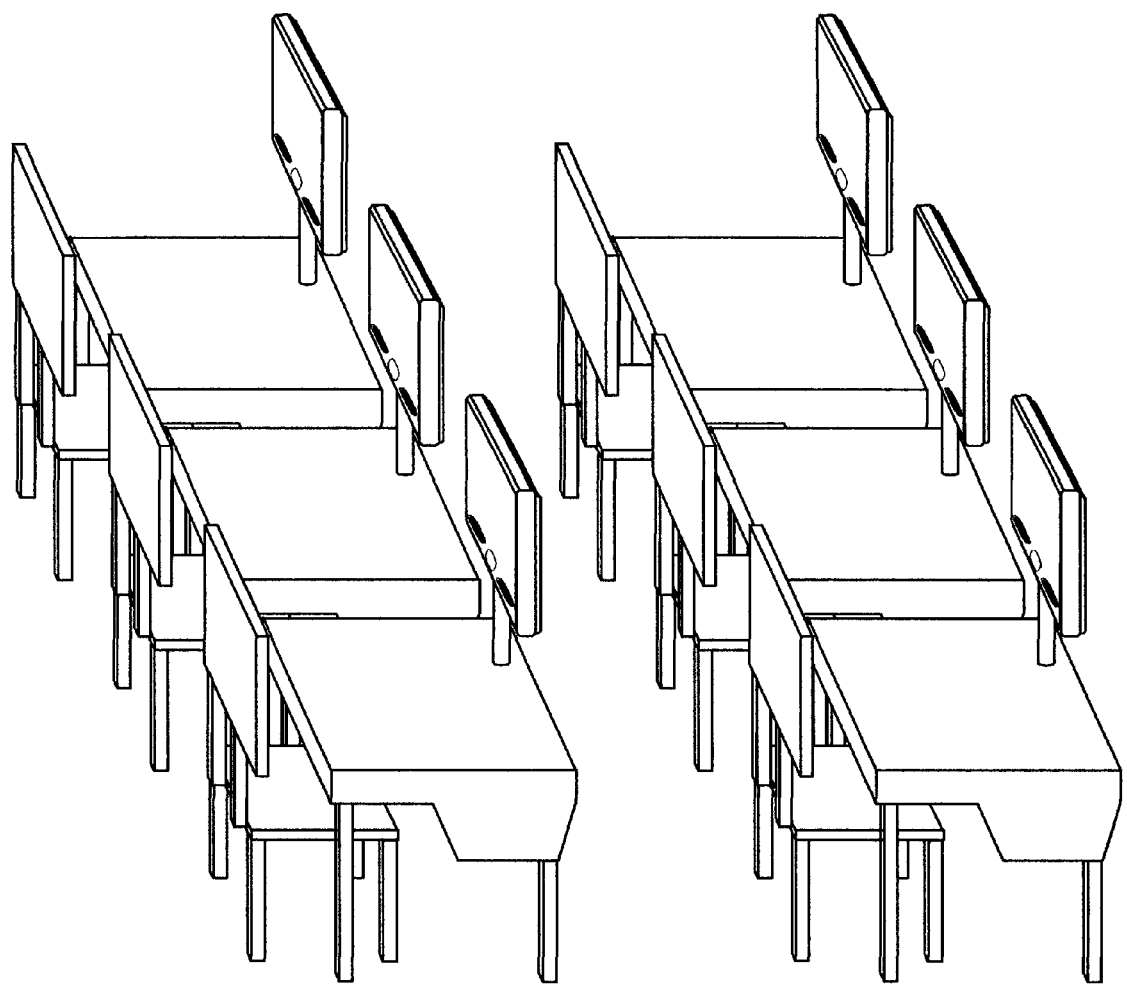
FIG. 20 shows a plurality of wireless display terminals in use in a class room setting.

FIG. 19 shows a variety of wireless display terminals connected and communicating with each other through control signals via a remotely located computer;

FIG. 20 shows a plurality of wireless display terminals in use in a class room setting.

Figure 21:
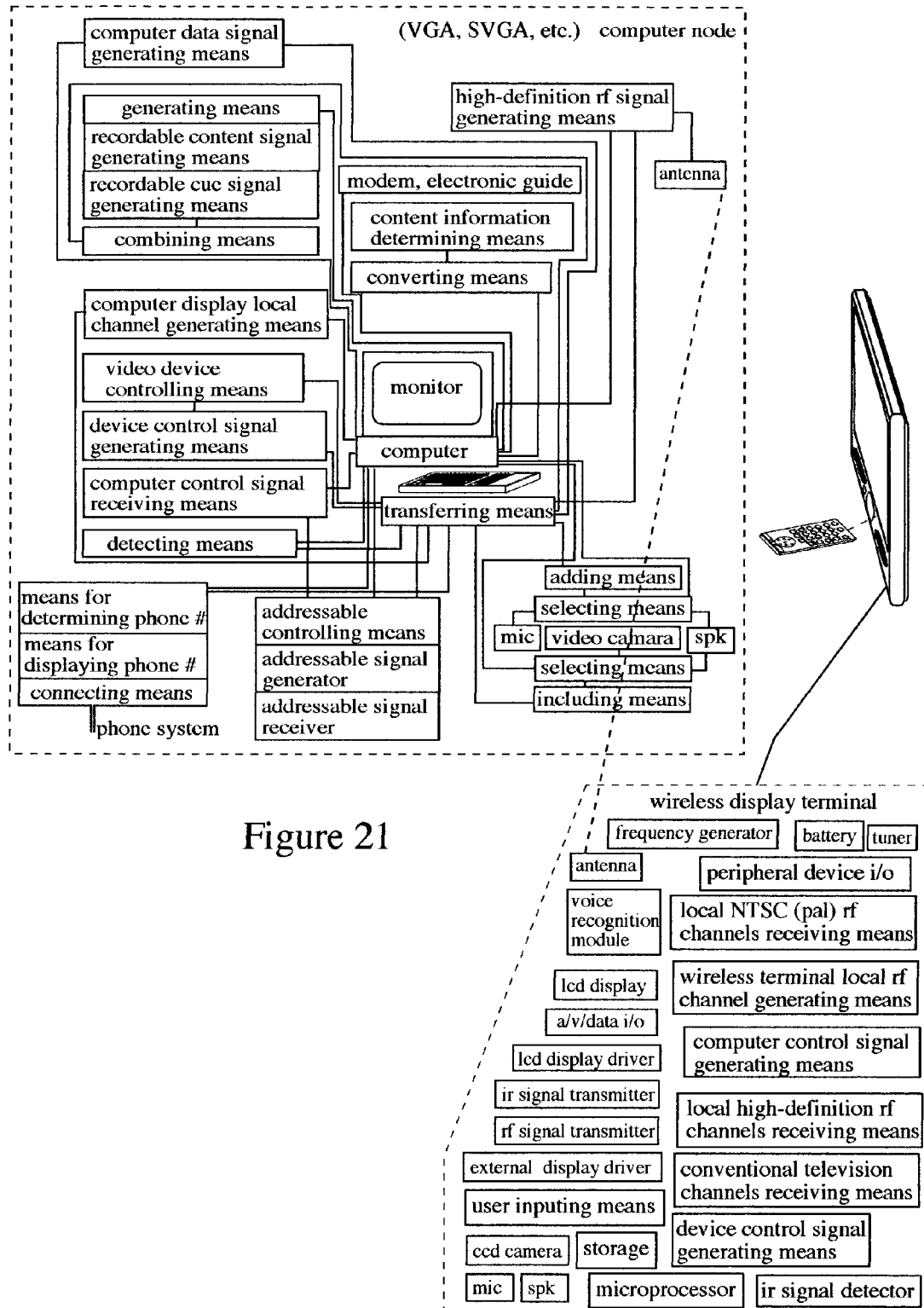
FIG. 21 shows a wireless display terminal connected with a multimedia network having the capability of simultaneously displaying conventional TV (NTSC, PAL) and high-definition (computer monitor, HDTV) display images.

FIG. 21 shows a wireless display terminal connected with a multimedia network having the capability of displaying TV (NTSC) and high-definition (computer monitor, HDTV) display images.

Figure 22:
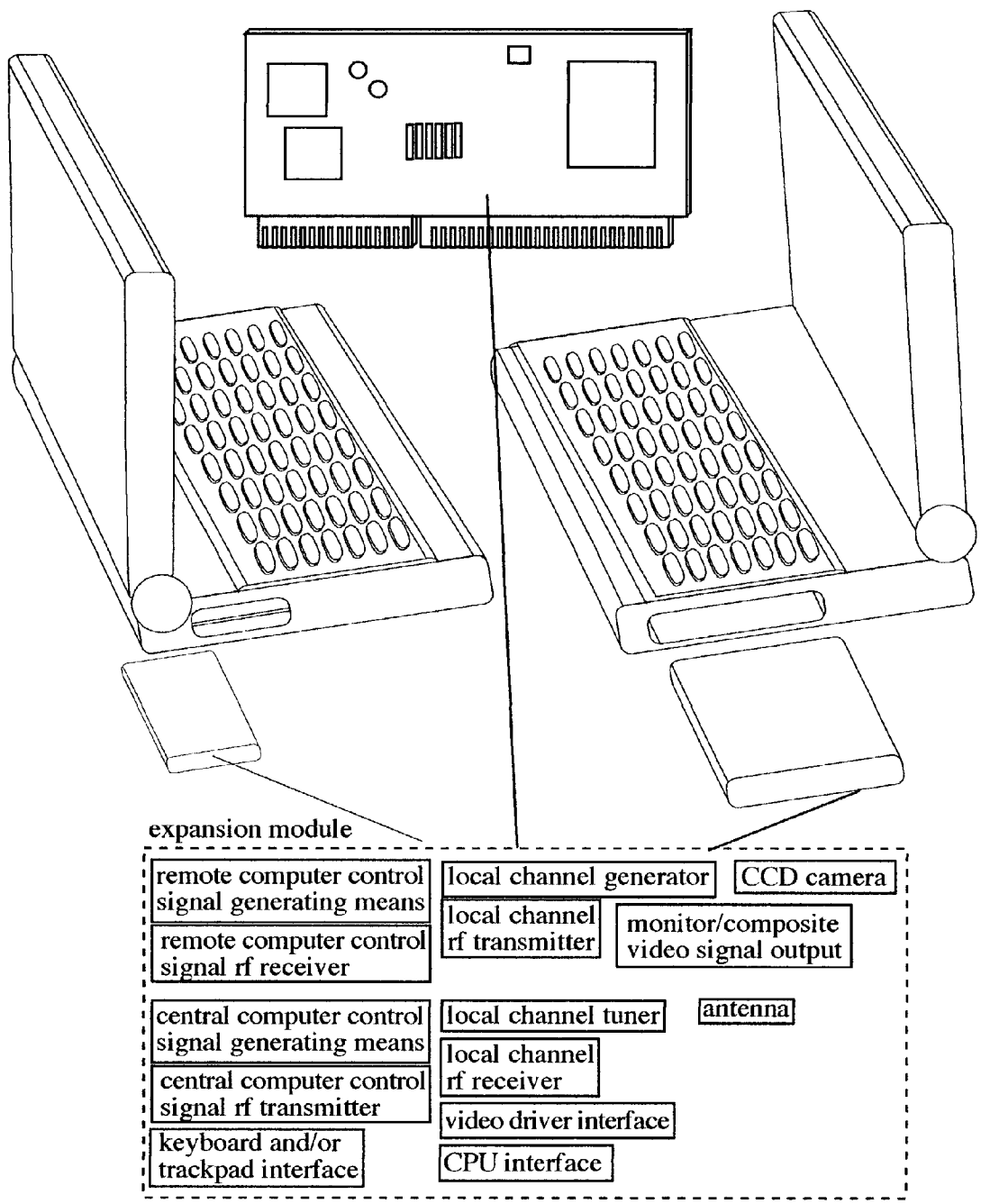
FIG. 22 shows an expansion module for use with a pre-existing notebook or desktop computer to enable simultaneous two-way audio, video, data and control signals generated by various devices connected to the network with the pre-existing computer.

FIG. 22 shows an expansion module for use with a pre-existing notebook or desktop computer to enable simultaneous two-way way audio, video, data and control signals generated by various devices connected to the network with the pre-existing computer. The expansion module includes expansion module interfacing means for interfacing with a computer expansion port. Local channel radio frequency receiving means is in communication with the computer through the expansion module interfacing means. The local channel radio frequency receiving means receives a radio signal channel containing at least one of a video and audio signal originating from an external audio and/or video signal generating device. A user input interfacing means is provided for interfacing with a user input device 18 of the computer and generating a user input signal. For example, the keyboard or mouse input device of the notebook computer is interfaced with the inventive expansion module through the user input interfacing means. Control signal generating means generates control signals in response to the user input signal for controlling the generation of at least one video and audio signal originating from the external audio and/or video signal generating device. Control signal radio frequency transmitting means wirelessly transmits the control signals to the external audio and/or video signal generating device.

The external audio and/or video signal generating device may comprise a second computer, such as a remotely located computer connected to the network via the inventive bridge circuit, having a wireless transmitter connected to at least one of a video and audio output of the external audio and/or video signal generating device for generating the radio signal channel. The external audio and/or video signal generating device may also be at least one of a video recorder, recorder, phone system, CCD camera, stereo, radio, CD player, set top box or DVD player having a wireless transmitter connected to at least one of a video and audio output of the external audio and/or video signal generating device for generating the radio signal channel.

A radio frequency transmitting means transmits at least one of a video and audio signal to the external audio and/or video signal generating device. The video and audio signal comprises the output of the computer connected to the expansion module. The expansion module interfaces with the computer via a single or combination of expansion ports, such as PCI slots, parallel and serial ports, monitor and video output ports, speaker and microphone ports, and the like.

Computer video signal connecting means connects with a monitor video signal source of the computer. The radio frequency transmitting means may receive a monitor video signal of the computer for transmission to the external audio and/or video signal generating device. A CCD video signal Connecting means connects with a CCD video signal source associated with the computer. The radio frequency transmitting means may receive a CCD video signal for transmission to the external audio and/or video signal generating device. Switching means may be provided for switching between the output of the Computer video signal connecting means 92 and the CCD video signal Connecting means and generating a video source output. The radio frequency transmitting means the video source output of the Switching means for transmission to the external audio and/or video signal generating device.

Figure 23:
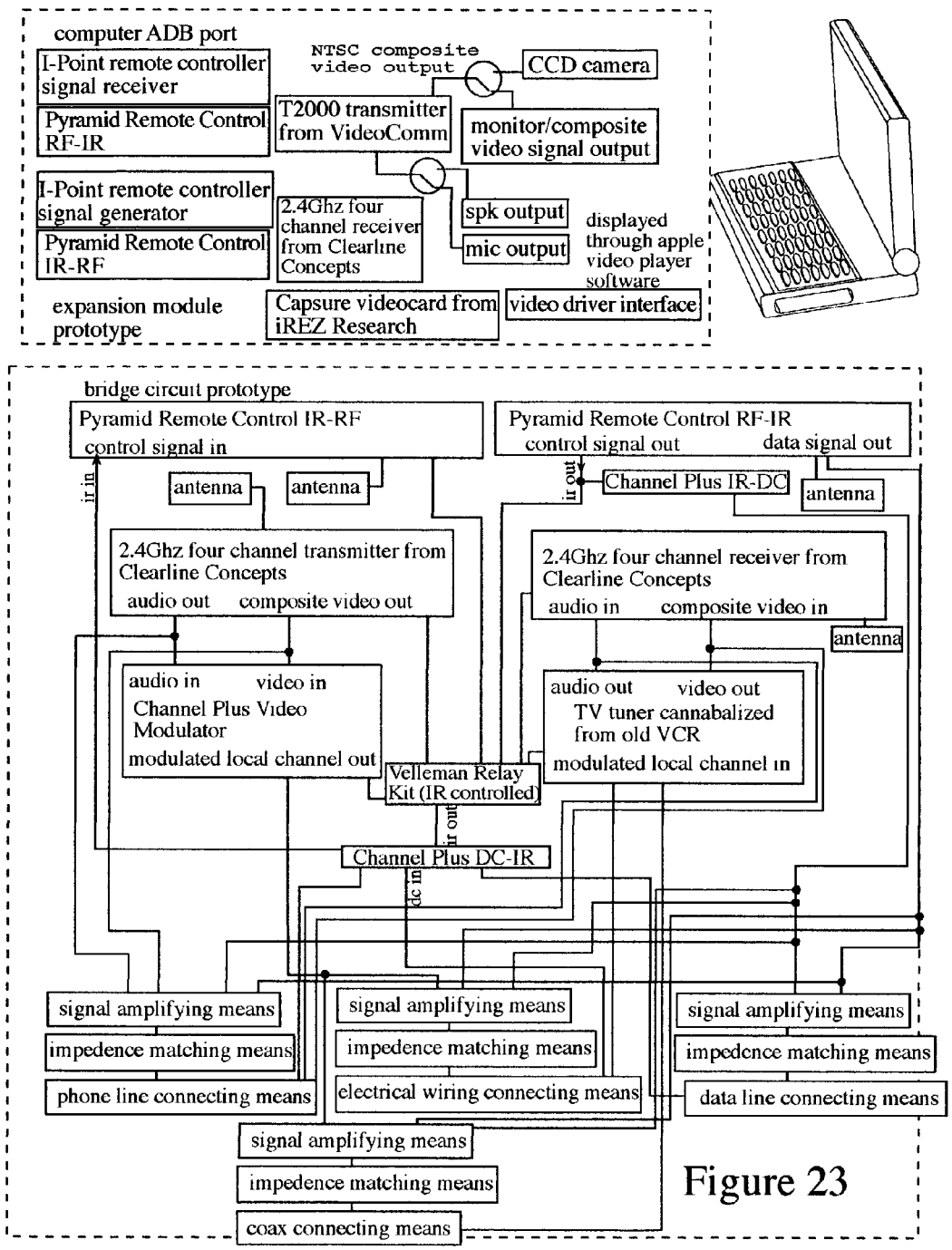
FIG. 23 shows a prototype configuration demonstrating the feasibility of the inventive bridge circuit and expansion module.

FIG. 23 shows a prototype configuration demonstrating the feasibility of the inventive bridge circuit and expansion module.

Figure 24:
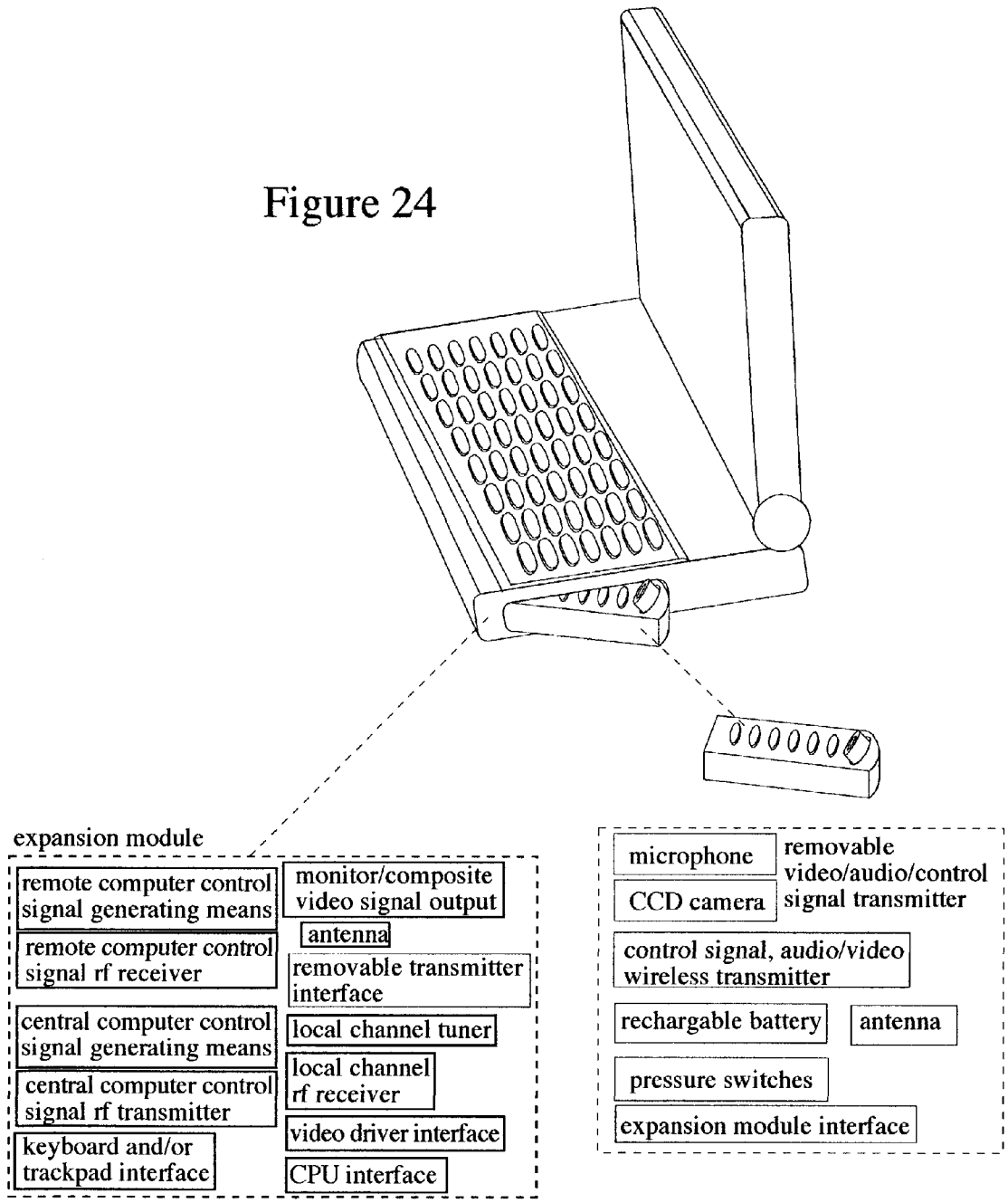
FIG. 24 shows an alternative embodiment of the inventive expansion module including a removable video/audio/control signal transmitter.

FIG. 24 shows an alternative embodiment of the inventive expansion module including a removable video/audio/control signal transmitter. In accordance with this embodiment of the inventive expansion module, interfacing means is provided for interfacing with a computer expansion port. Local channel radio frequency receiving means in communication with the computer through the expansion module interfacing means receives a radio signal channel containing at least one of a video and audio signal originating from an external audio and/or video signal generating device. User input interfacing means interfaces with a user input device 18 of the computer and generating a user input signal. Control generating means generates control signals in response to the user input signal for controlling the generation of at least one video and audio signal originating from the external audio and/or video signal generating device. Control signal radio frequency transmitting means wirelessly transmits the control signals to the external audio and/or video signal generating device. A removable signal transmitter is provided including at least one of a CCD camera, microphone and control signal generator; an expansion module interface for removably connecting the removable signal transmitter with the expansion module. The removable signal transmitter may be used to control the external computer and device (directly or through the various network connections described herein), and may be used to control the computer connected with the inventive expansion module. The video and/or audio signal transmitted from the removable signal transmitter may be received and displayed by the devices connected to the network, and/or may be received and displayed by the computer connected with the expansion module.

Computer video signal connecting means 92 can be provided for connecting with a monitor video signal source of the computer. Switching means may be included for switching between the output of the Computer video signal connecting means 92 and the removable signal transmitter and generating a video source output.

Figure 25:
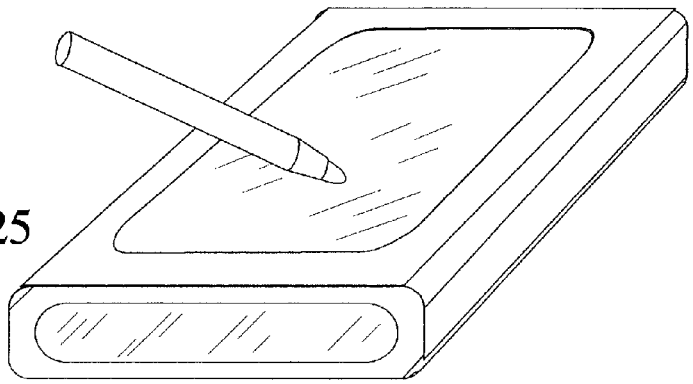
FIG. 25 shows a PDA-type wireless display device displaying static and moving videographic page information.

FIG. 25 shows a PDA-type wireless display device displaying static and moving videographic page information.

Figure 26:
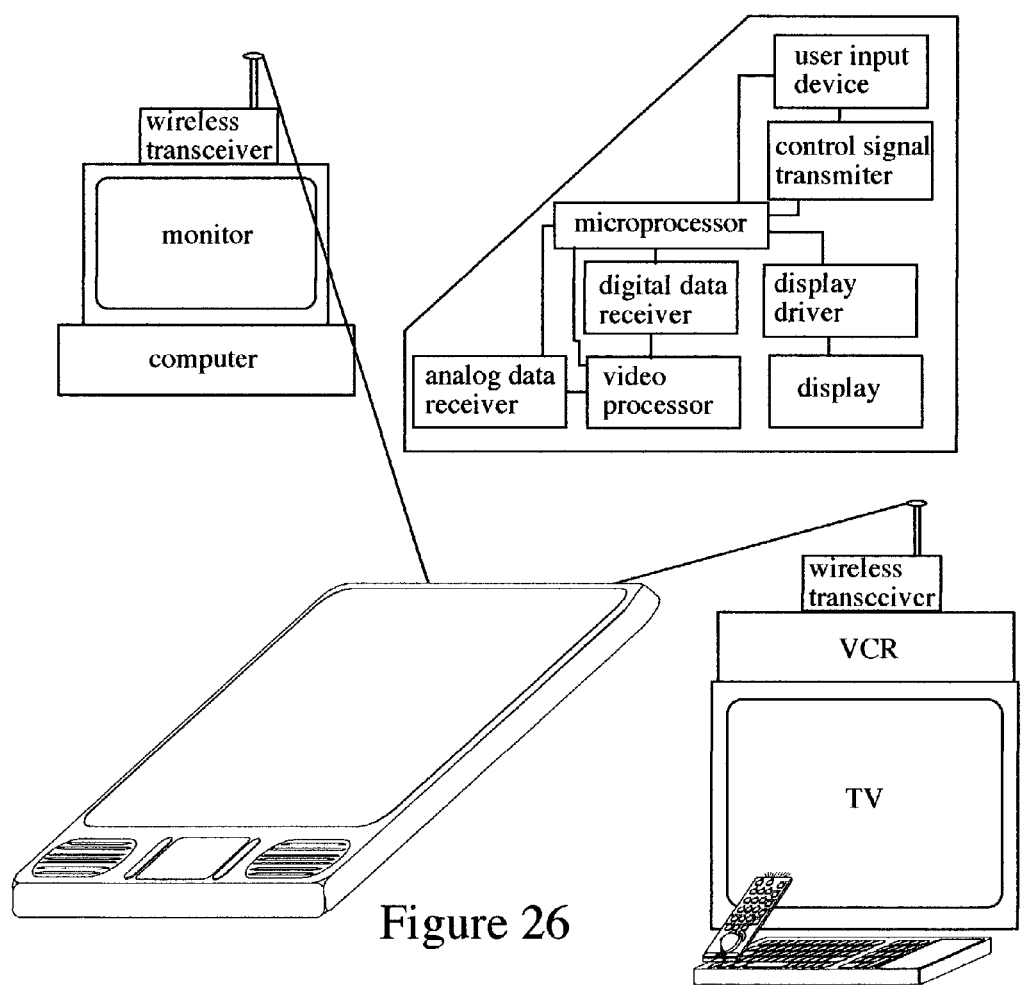
FIG. 26 shows an inventive wireless display terminal capable of displaying a screen image composed of video data simultaneously received from two or more wireless sources.

FIG. 26 shows an inventive wireless display terminal capable of displaying a screen image composed of video data simultaneously received from two or more wireless sources. The inventive wireless display terminal system includes control signal generating means for generating control signals for controlling at least one remotely located data source. The remotely located data sources may be, for example, a computer, a recorder, DVD, set top box or other multimedia device. As described elsewhere herein, the remotely located data sources include wireless signal transmitting devices that emit a wireless signal containing video, audio, and/or data information. A first wireless data signal receiving means receives a first wireless data signal (for example, a digital data signal containing Internet content from a computer) Alternatively, the digital data signal can come from a wireless modem connected directly to wire network, such as a phone line or cable network. In this case, the wireless display terminal includes means for receiving the Internet content in the form of a wireless modem signal and creating a screen image dependent thereon, and means for requesting Internet content through the wireless modem.

A second wireless signal receiving means receives a second wireless data signal (for example, a television channel from a set top box). A video processing device processes the video information contained in the first and the second wireless data signal. The video processing device is effective for outputting a composed video signal containing a screen image composed of a split screen or picture-in-a-picture display comprised of the video information. Stated otherwise, the video processing device is capable of creating a screen image that includes the digitally transmitted Internet content having a PIP image of an analog transmitted television show. Such a video processing device is available from Oxford Micro Devices or Oxford Connecticut (www.omdi.com). Display driving means receives the composed video signal and outputs a display driving signal. A display, such as an LCD, receives the display driving signal and displays the screen image. Thus, in accordance with the present invention, a wireless display terminal is provided that allows a user to access the Internet while viewing a television program.

As the Internet becomes the source of computer applications, such as word processing, appointment books, etc., the inventive wireless display device will provide an inexpensive solution for performing most of the activities that are now done using a conventional desktop computer. In this case, the inveniTVe wireless display device may include a local storage device, such as a hard drive, to keep documents and other files locally available.

Figure 27:
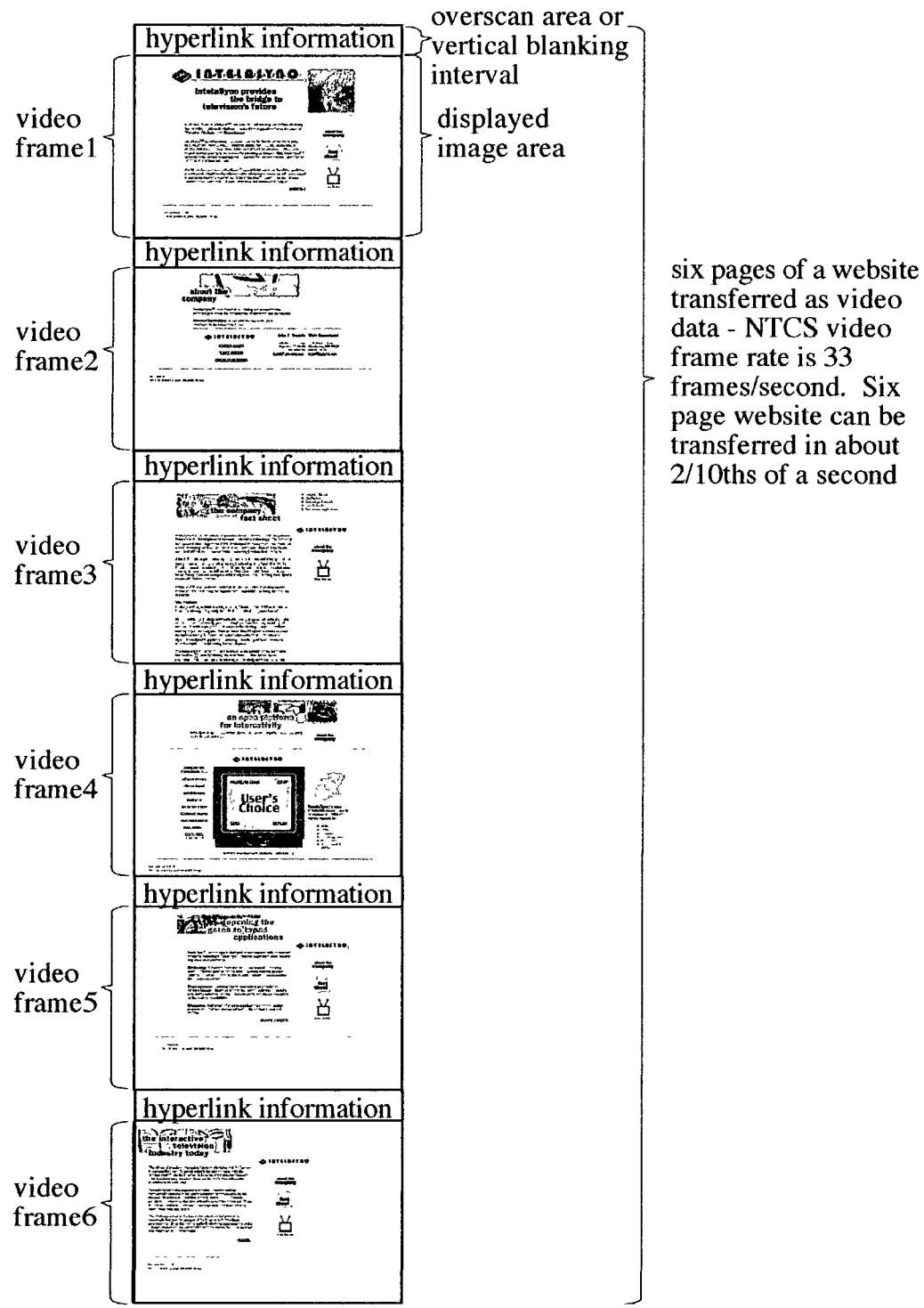
FIG. 27 illustrates the transmittal of six frames of a video stream containing six pages of a website in accordance with the inventive method of transmitting hyperlinked content to multiple display devices.

FIG. 27 illustrates six frames of a video stream containing six pages of a web site. In accordance with the present invention, the six frames of the website are transmittable as video frame data to enable high speed transfer of the entire website via a television signal transferring system such as cable television. Using, for example, a conventional NTSC broadcast television channel carrying one page per video frame, the entire six pages of the website can be transmitted in about 0.2 seconds. In accordance with the present invention, the web pages are generated as individual frames of a video stream. As an example, an NTSC video transmission has a frame rate of about 30 frames per second. Thus, in accordance with the present invention, the six pages of the website shown in FIG. 27 can be transmitted in about two tenths of a second. The static display information is contained within the display area of the video frame. The overscan area or the vertical blanking interval (or other displayed and/or non-displayed area) of the video frame or video signal is used to carry hyperlink and other non-display information.

Figure 28:
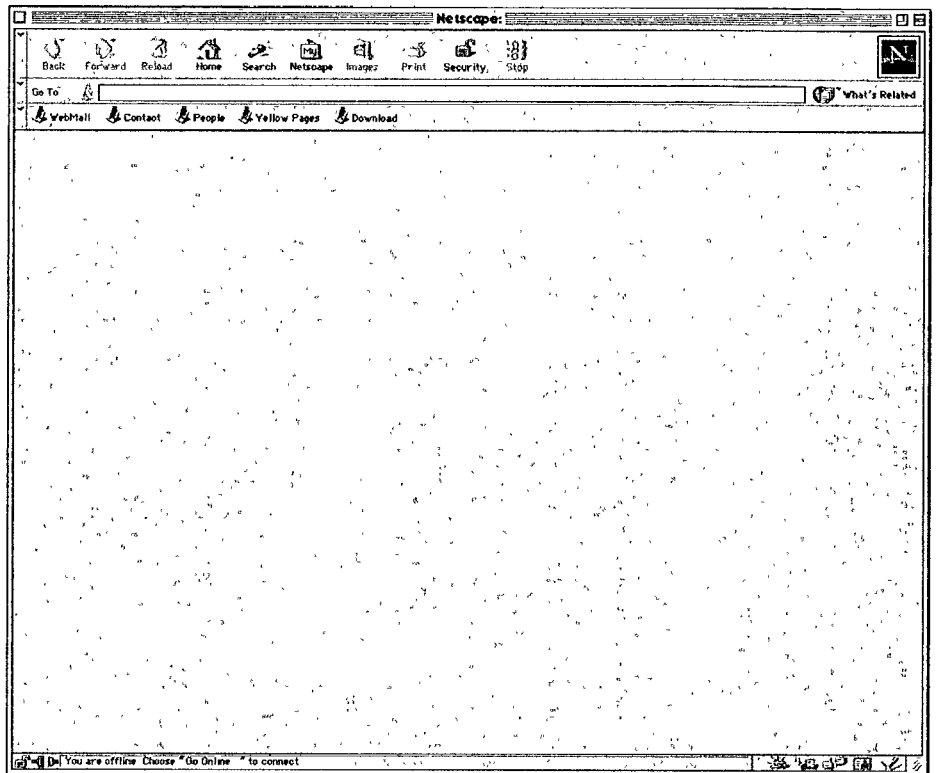
FIG. 28 illustrates a blank browser page used to navigate through downloaded page content.

FIG. 28 illustrates a blank browser page which is used to navigate through the downloaded web pages and to make a connection with the Internet to acquire additional information not included in the transmission. For example, the transmitted web site may include hyperlinks to additional web pages and web sites which can be accessed through a modem connection with the Internet. The blank browser page includes a display area in which is inserted the display information retrieved from the received video transmission.

Figure 29:
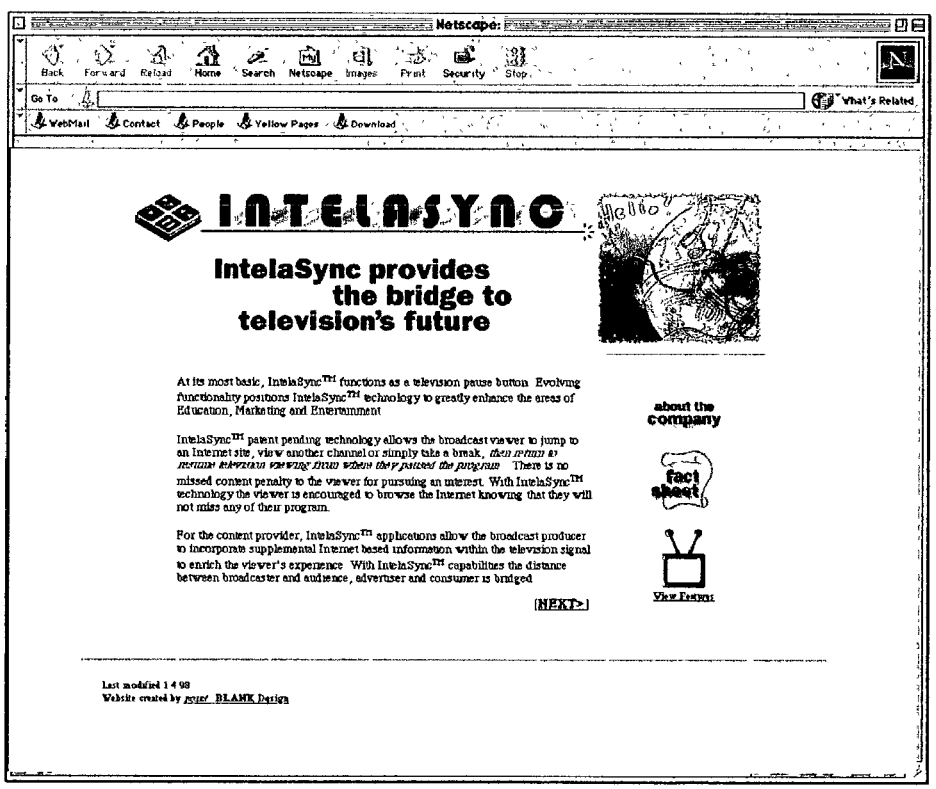
FIG. 29 shows display information contained in Frame 1 of FIG. 27 displayed within the browser frame shown in FIG. 28.

FIG. 29 shows the display information contained in Frame 1 of FIG. 1 displayed within the browser frame window. In accordance with the present invention, the displayed webpage looks the same as a webpage retrieved from the Internet, although it is has been transmitted at a substantially higher rate of transmission than is available from a conventional Internet connection.

Figure 30:
FIG. 30 illustrates a single frame of the video stream shown in FIG. 27 including the display information and non-display information corresponding to the page contained within the frame.

FIG. 30 illustrates a single frame from the video stream shown in FIG. 27. The frame includes the display information which is contained within the displayed image area. The frame also includes the hyperlink and other non-display information which is contained within the non-display portion of the video frame or video signal. The non-display information shown in FIG. 30 is, for illustrative purposes, indicated in English words. However, as is described below, this non-display information is preferably transmitted in digital form via the use of the available states of pixel information contained within the video signal. The display information is a static frame of video data. Thus, in order for the hyperlinks to be activatable, the position and boundaries of the hyperlink must be determined. Do the hyperlink by order and reached by tabbing through the hyperlink order, also in the voice recognition system, the spoken word for the hyperlink and the alternative forms expected to be spoken can be included in the hyperlink information to enable voice recognition. For example, the hyperlink "about the company" would include variations of the phrase "about the company" The non-display information that is contained within the video signal may include hyperlink information including the link title, image location, the target of the link, and what operation(s) is to be performed when the link is clicked. For example, the hyperlink information may include an operation command that changes the color of all the black pixels to blue when clicked. Thus, once the hyperlink is clicked, all the black pixels that make up the text of the hyperlink graphic are changed to blue, giving a visual indication to the user that this hyperlink has been activated. The hyperlink is activated when the cursor enters within the image location boundaries and the mouse is clicked. In other cases, for example in the use of a remote control that includes a means for tabbing through the hyperlinks, the hyperlink is activated when the hyperlink is tabbed to, and the enter button or other such button on the remote control is clicked. The image location is relative to some standard landmark on the page such as the top left corner or other suitable page landmark. The "link to" information for the particular hyperlink indicates what the target of the hyperlink is. In this case, for example, the hyperlink with the link title "about the company" is at a specific image location designated by a rectangle determined by the position of the top left corner and bottom right corner relative to the page landmark. The link "about the company" when activated causes the video frame 2 in the example shown in FIG. 27 to be retrieved from the video memory and its display image is displayed as the next web page. The non-display display information is deciphered as will be described below and loaded, for example, into RAM so that this new page's hyperlinks and other non-display information can be utilized. Other operations can be performed, such as controlling televisions, communication devices, lights, security systems, and the like, and the links can be to other Internet content or to controlling appliance like recorders. The hyperlinks contained in the webpage shown in FIG. 30 include links to the other webpages that are shown in FIG. 27. For example, the link title "fact sheet" when activated will bring up video frame 3 through the operation "goto linked page". Another link towards the bottom of the page shown in FIG. 30 is titled "Point Blank Designs". This link when activated performs the operation of opening a new email message with the email address nycs8@aol.com. The hyperlinks can perform various other operations typically done by hyperlinks contained in Internet webpages. Further, the hyperlinks can be used to activate or operate local devices, such as recorders, telephone systems, computers, televisions and the like.

Figure 31:
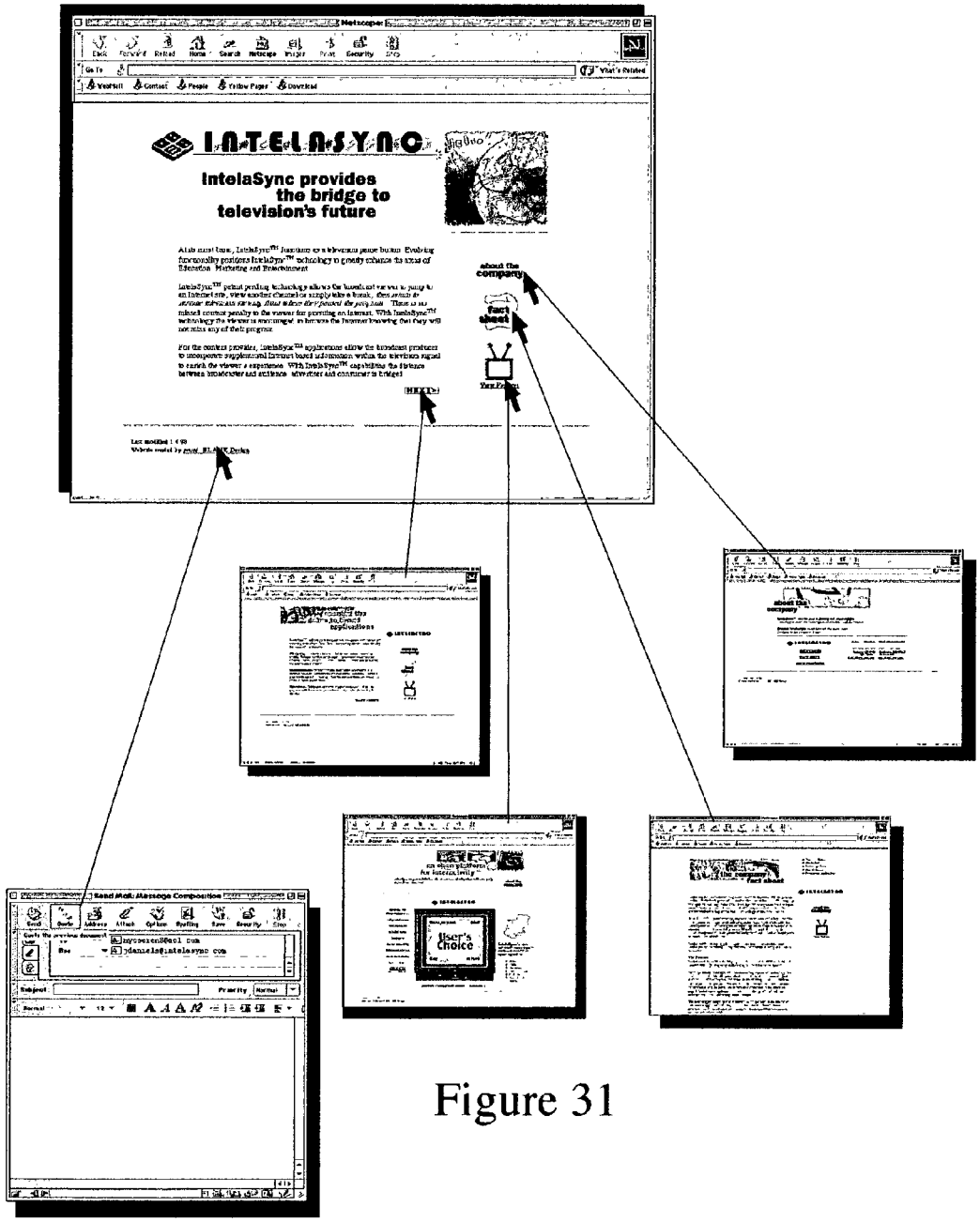
FIG. 31 illustrates the various links and their operation that results when the hyperlinks shown in FIG. 30 are activated.

FIG. 31 illustrates the various links and their operation that results when the hyperlinks shown in FIG. 30 are activated.

Figure 32:
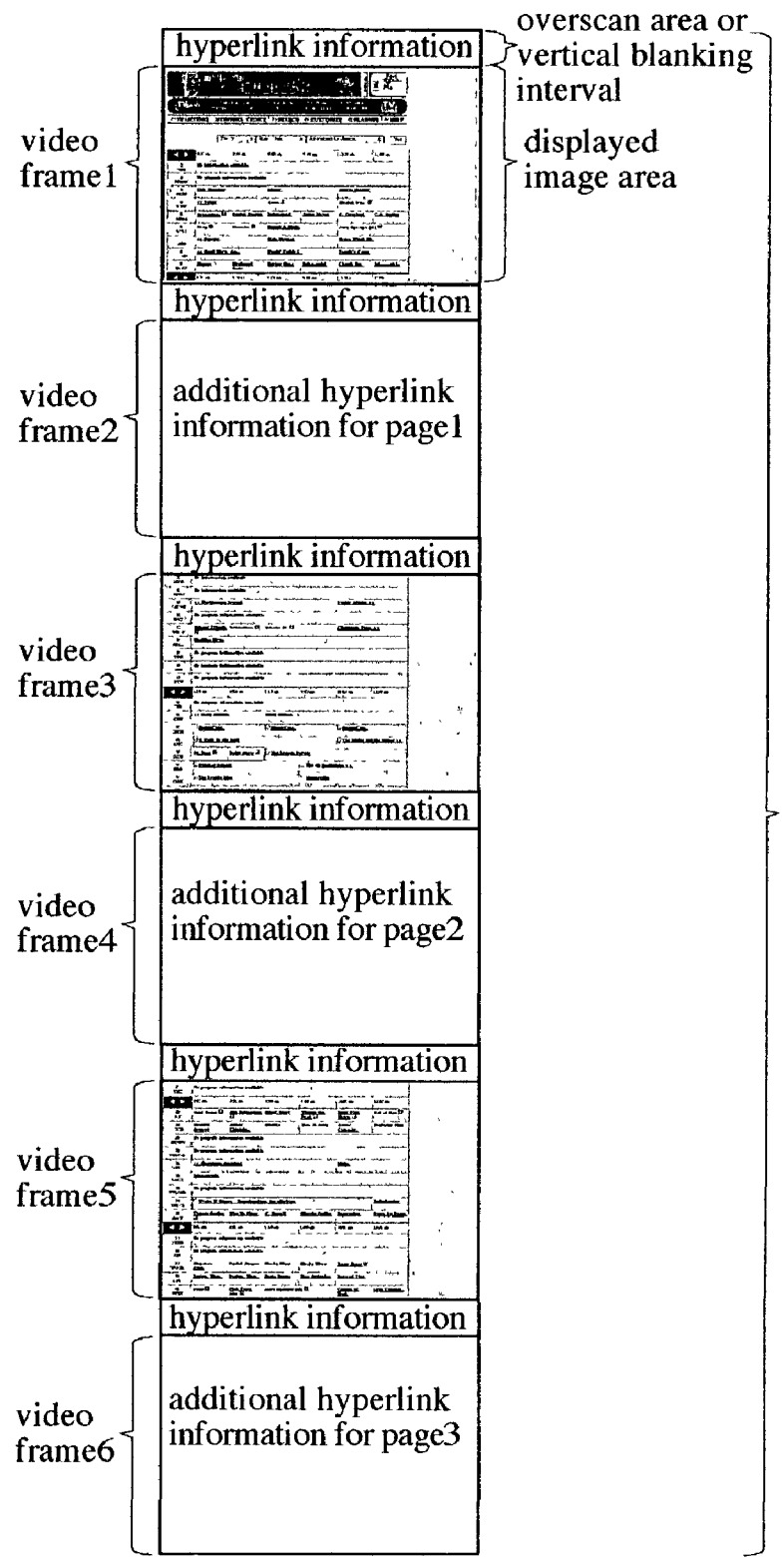
FIG. 32 illustrates another series of web pages that are transmitted as video data.

FIG. 32 illustrates another series of webpages that are transmitted as video data. In this case, the web pages consist of a television programming guide. The programming guide includes a program grid that has television shows that are available on, for example, a cable television provider's system. In accordance with this aspect of the invention, the television programming guide can be transmitted to the cable television subscribers complete with webpages that correspond to the various viewing choices that are available. The portion of the video signal that is captured by the subscriber's box can be customized depending on the subscriber's preferences and viewing habits. Thus, for example, a subscriber who is interested in science fiction can have in-depth webpages captured that pertain to television programs that pertain to this genre. Further, by determining the demographics of the particular subscriber, specific commercial messages, news reports, advertising incentives and the like and can captured from the television signal. As shown, the display displayed information for a page can be sent as a single video page. One or more video frames can be used to carry the corresponding hyperlink and related information. For example, if the page has a lot of hyperlinks, all the hyperlink data may not fit within the available non-displayed portion of the television signal associated with that frame. Thus, the link data can be included in the adjacent video frame both in the display area and the non-display area.

Figure 33:
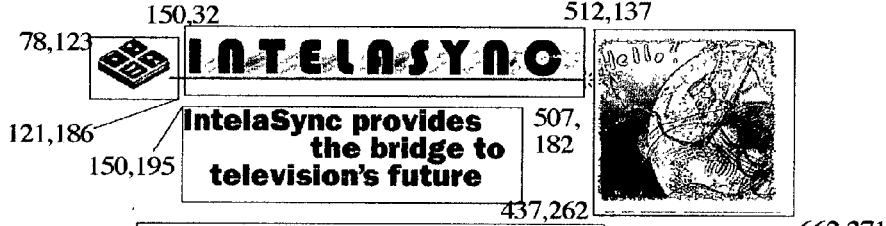
FIG. 33 shows a web page with the corresponding non-display data included along with the page.

FIG. 33 shows a web page with the corresponding non-display data included along with the page. In this case, the non-display data includes the page title "entrypage", page location "video A1 frame 1", and the page reception information. This page reception information may include the frame number, in this case, 2132507, followed by the reception date, in this case, Jan. 15, 1999. This page reception information can be used as the page link designation or otherwise used to keep track of the various frames of webpage video data that is received. Also included is the element data for the various graphic elements making up the page. The element data includes the page element title, the image location, the element order and the element type. Thus, for example, if the viewer wishes to obtain an editable text clipping from the web page, he can do so by clicking on the desired text and copying the text image to an OCR program which would convert the text image into editable text.

The type of data for each page element can be included in the page data. For example, text data can be identified as text, contained within predefined boundaries, so that the text image can be captured and converted into editable text using an OCD-type program. Animation or motion video can be included by linking each frame of the animation to the additional pages containing the other frames. During playing of the animation clip, each page in the animation series is displayed at the appropriate frame rate, the other page elements remain constant. If there are two or more pages with video or animation content, their video content can be combined into a single page. When viewed, the other page content remains fixed and acts as a mask while the moving image content of the page is played behind the mask. That is, the mask has a window that lets the video image content come through. For images that might be "blown up", the image data can be increased so that the pixel resolution of the blown up image is high. Pixel information is used to carry binary data, hyperlinks, data types, etc. Pixel state (on/off, luminosity, color, etc. can be used to convey the information. To decode, the pixel data is retrieved from the video frame. Video content and TML content can be "pushed", that is, loaded onto a recording device such as a hard drive day and night or at appropriate times. This pushed content may be encrypted so that the content provider, such as a cable company, can charge for the encryption key. The hyperlinks can include links to video footage stored on the HD, or to be downloaded and stored (such as television programs that are coming on in the future, PPV or VOD). The hyperlinks can include links to Internet content, with access to the Internet content initiated with the link is clicked. The content can include daily newspapers with video linked news reports, catalogs, etc. with a check to determine the "freshness" of the downloaded content, only new content needs to be sent.

Figure 34:
FIG. 34 illustrates how the binary video data stream can be conveyed using just the on/off states of the pixels of the video image.

FIG. 34 shows how the binary video data stream can be conveyed using just the on/off states of the pixels of the video image. In this case, the bright pixels represent binary digits 0 and the black pixels represent binary digit 1. Thus, the non-display information can be transmitted as part of the video information and later determined from the video information by detecting the bright and dark states of the pixels in serial order as they are displayed.

Figure 35:
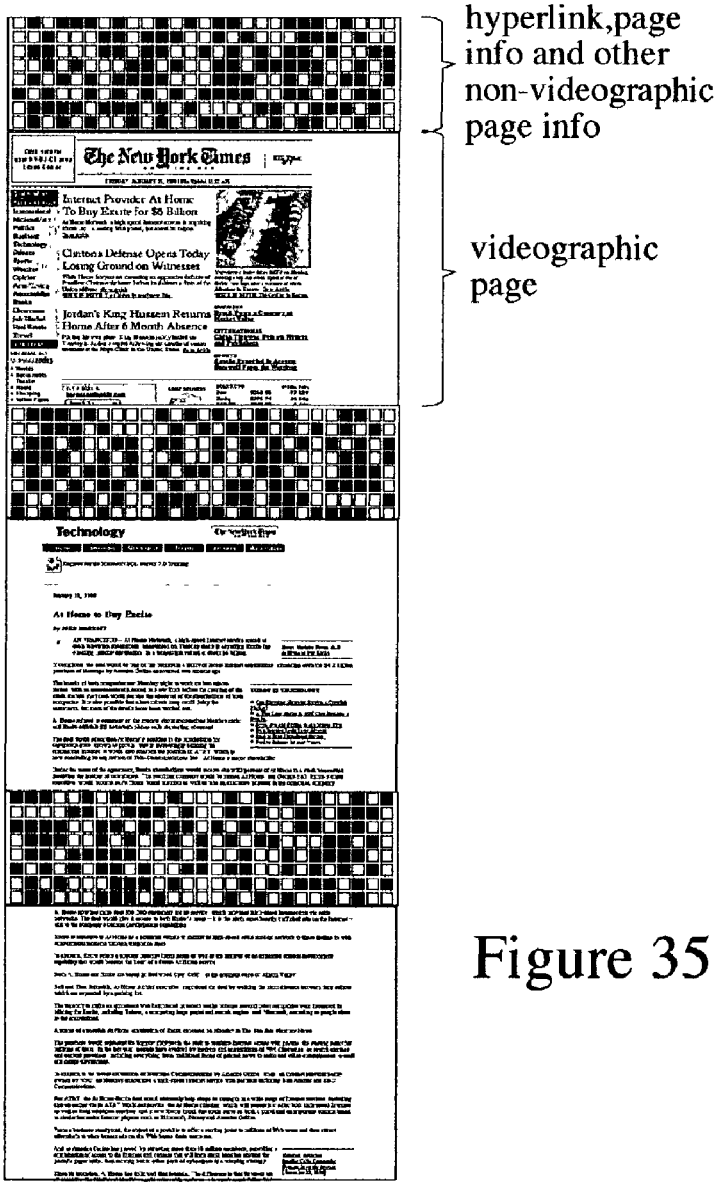
FIG. 35 illustrates a video stream containing display page information contained within the displayed area of the individual video frames, and hyperlink page information and other non-display page information contained in the non-display area of the video signal or video page stream.

FIG. 35 illustrates a video stream containing display page information contained within the displayed area of the individual video frames, and hyperlink page information and other non-display page information contained in the non-display area of the video signal or video page stream. The display information displayed the entire website page, or a portion of it, as a still frame taken from the received video frame signal. If the page is larger than a single frame, two or more video frames can be linked together with the link operation indicating that the browser is to display the pages with scrollability. The non-display information includes the targets of hyperlinks, page title and other information. This data can be transmitted as binary information that can be discerned from the pixel information. To retrieve the binary data stream, the state of each pixel is determined, perhaps in its scan sequence or other predetermined order. This pixel state is converted into a binary data stream from which is determined the contained non-display information.

In accordance with the present invention, a browser-type computer program is provided for controlling the display of the html-type documents received as described above. This browser-type application has a number of advantages over conventional Internet web browsers, such as Netscape Navigator, Netscape Communicator and Microsoft's Internet Explorer. The inventive browser-type program requires relatively little computer memory to operate, making it particularly suitable for relatively inexpensive PDAs, set top boxes, and other such devices.

The videostreaming HTML document format described above can be obtained by converting other HTML-types of documents, such as those currently found on the Internet, into the videostreaming HTML document format. Thus, for example, Internet content can be collected from the Internet as is done conventionally using a desktop computer, and then this content can be converted into the inventive video-streaming HTML document format. This videostreaming HTML content can be then transferred from the desktop computer to, for example, a PDA thereby allowing low memory capacity devices, such as PDAs to store much larger quantities of Internet content than conventionally possible. The inventive browser-type program can also be used to convert other documents into hyperlinked video-streaming HTML documents for transmission to display devices. In accordance with this aspect of the present invention, a display device only needs to be able to display a frame (web page) of video information received from an "Internet or intranet gateway" device. The display device does not have to be able to decode html, reconstruct GIF images for display, etc. These actions are done by the gateway device. The display device receives the web page as frames of video (or as a still image) and it is displayed. If the display device includes buffering means for buffering data, then it can receive "bursts" of content information from the gateway device, optimizing data transmission to multiple display devices. To activate, for example, a hyperlink cursor location determining means onboard the display device determine where a superimposed cursor is located relative to the hyperlinks on the page when the user clicks on a hyperlink. This hyperlink location information is transmitted to the gateway device where it is interpreted to determine which hyperlink the user intends to activate. The activation of the hyperlink by the user can be performed by other mechanisms, such as tabbing through the links on a page, etc. The information regarding where a hyperlink is located, what it is linked to, etc. is maintained by the gateway thus, alleviating the need to have much processing power, if any, onboard the display device for accessing the Internet or intranet content. Further, "public" channels can be provided that can be accessed by multiple displays simultaneously for showing, for example, a movie or news report to users within a network environment such as an airplane, airport or grocery store.

Figure 36:
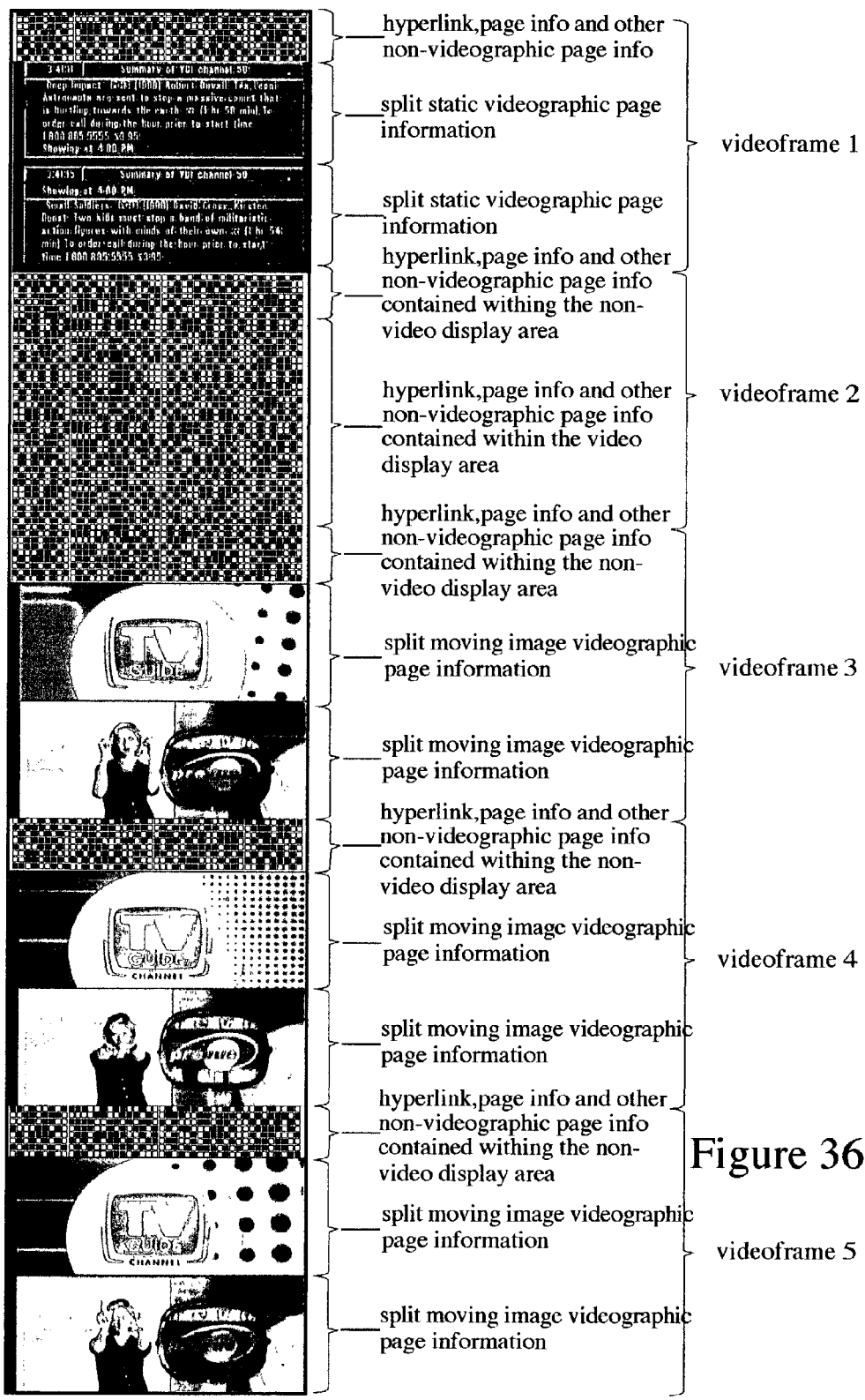
FIG. 36 illustrates a stream of video data provided along with hyperlink, page information and other non-videographic page information, with split static videographic page information provided along with split moving image videographic page information.
Figure 37:
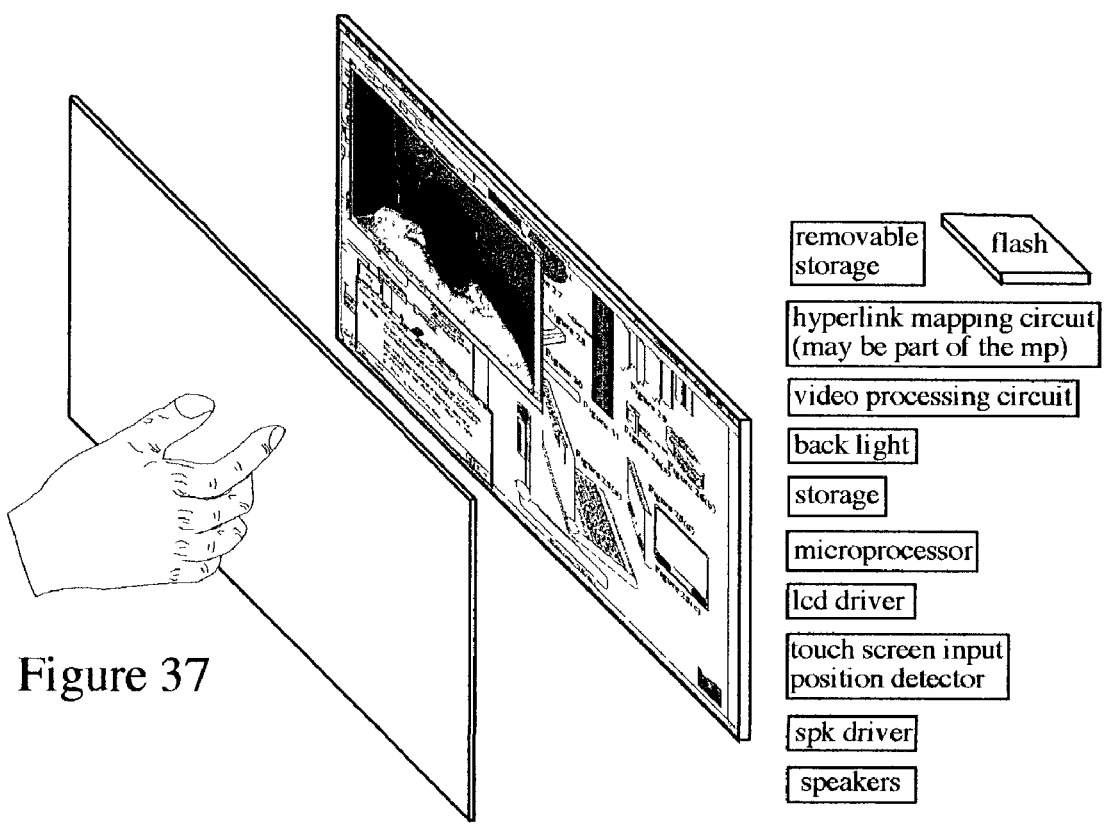
FIG. 37 shows a block diagram of an inventive display device for use with the inventive method of transmitting hyperlinked information.

FIG. 36 illustrates a stream of video data provided along with hyperlink, page information and other non-videographic page information, with split static videographic page information provided along with split moving image videographic page information;

FIG. 37 shows a block diagram of an inventive display device for use with the inventive method of transmitting hyperlinked information.

Figure 38:
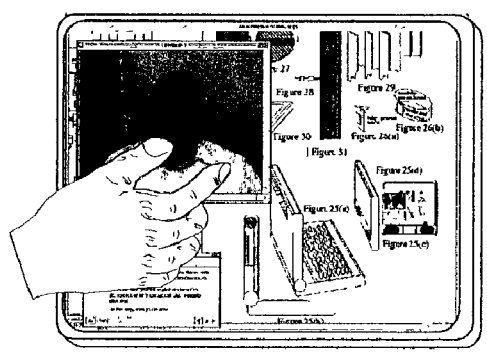
FIG. 38 illustrates a wireless display device receiving a window of moving image videographic page information superimposed on a screen of static videographic page information.

FIG. 38 illustrates a wireless display device receiving a window of moving image videographic page information superimposed on a screen of static videographic page information.

Figure 39:
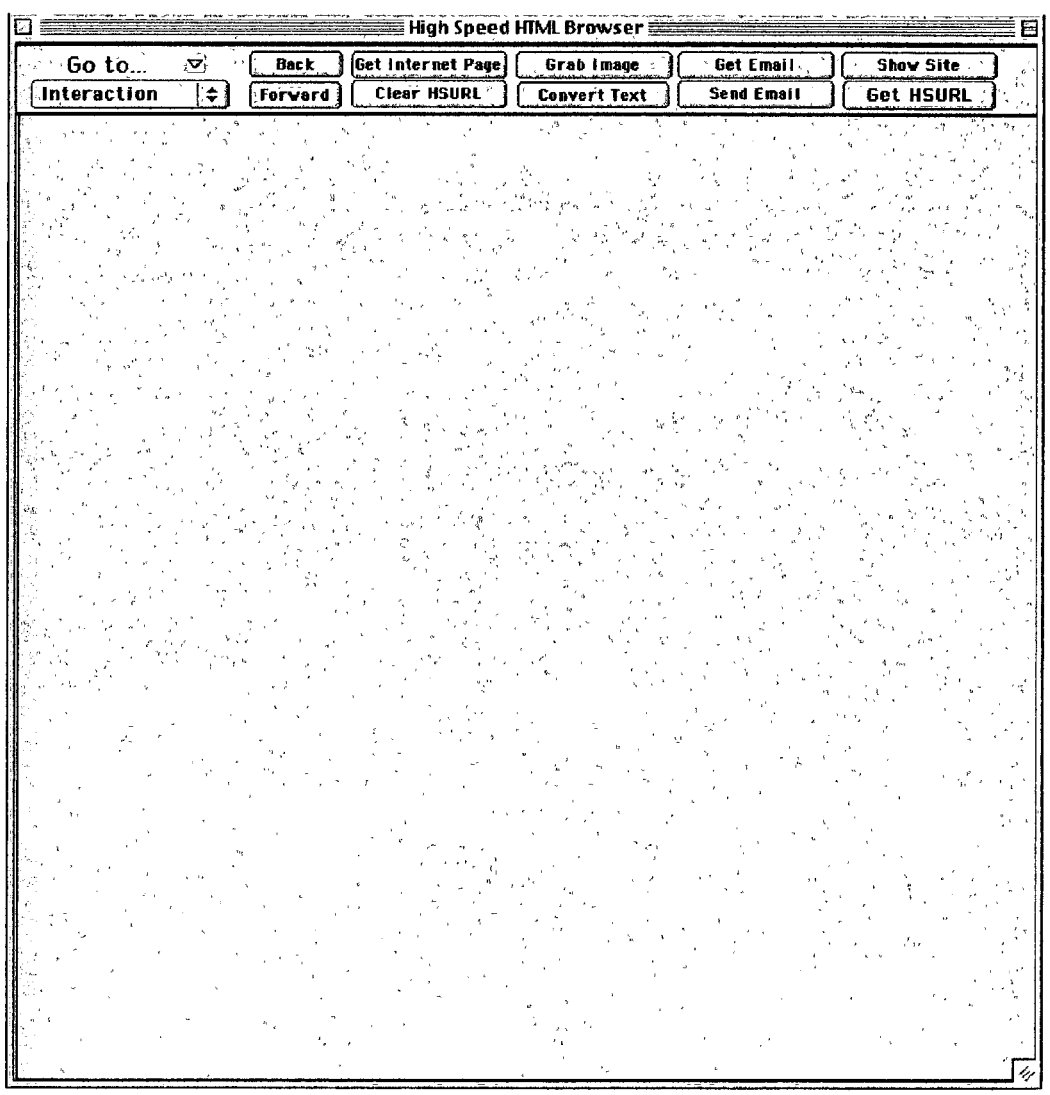
FIG. 39 shows a blank page of a high speed HTML browser window in accordance with a prototype software program.

FIG. 39 shows a blank page of a high speed HTML browser window in accordance with the prototype FaceSpan software program.

Figure 40:
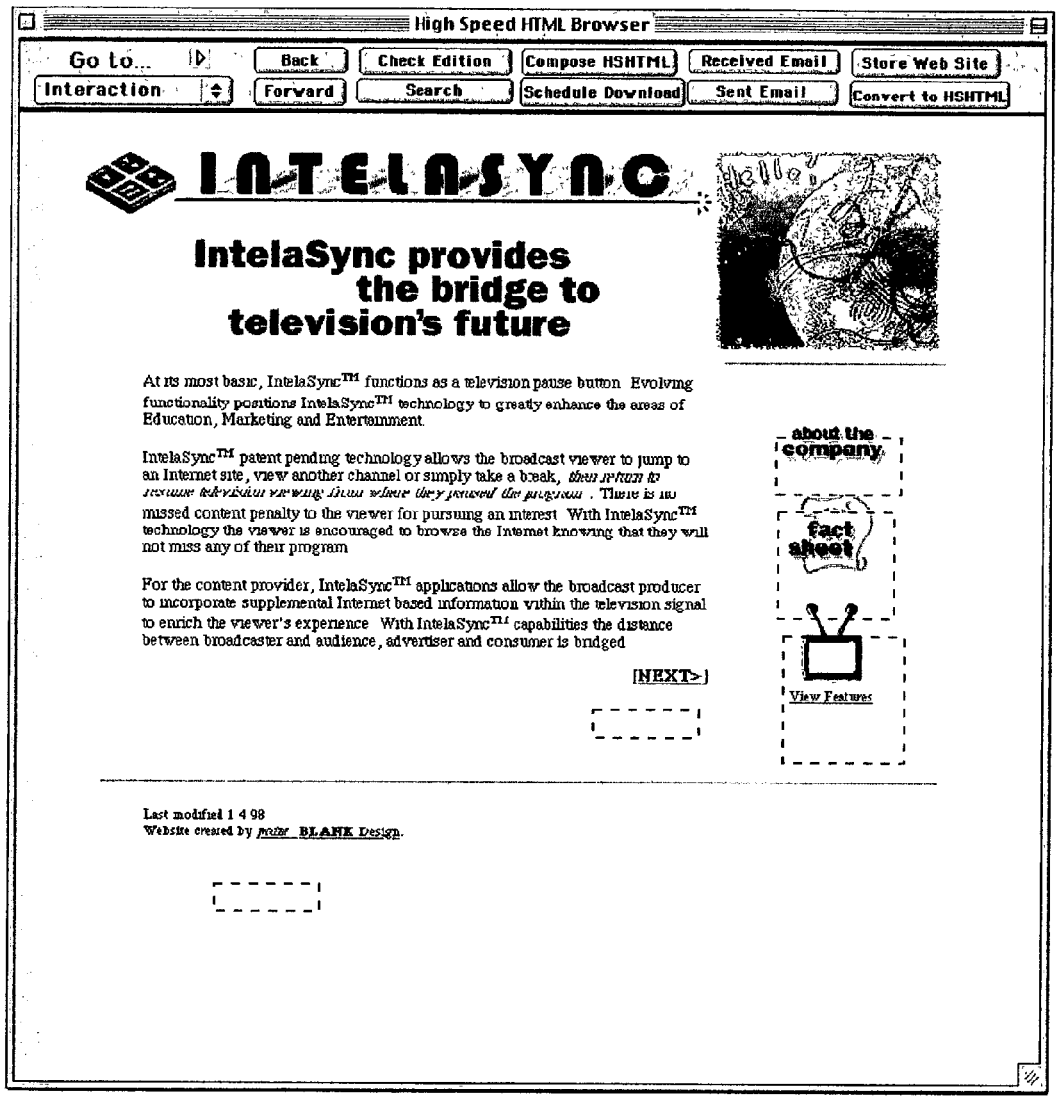
FIG. 40 shows an Internet page having the grid locations of the page's hyperlinks determined and the page displayed in the browser window shown in FIG. 39.

FIG. 40 shows an Internet page having the grid locations of the page's hyperlinks determined and the page displayed in the browser window shown in FIG. 39.

The invention claimed is:

1. A thin, lightweight, flexible, bright, wireless display having components capable of being manufactured by a printing method, comprising:
    a flexible substrate having a top surface for providing a support structure upon which components can be manufactured by a printing method;
    a display stratum comprising light emitting pixels for displaying information, the light emitting pixels being formed by printing a pixel layer of light-emitting conductive polymer;
    an electronic circuit stratum including signal transmitting components for transmitting user input signals to a display signal generating device for controlling display information transmitted from the display signal generating device, signal receiving components for receiving the display information transmitted from the display signal generating device, and display driving components for driving the display stratum according to the received display information;
    a user input stratum for receiving user input and generating the user input signals; and
    a battery stratum for providing electrical energy to the electronic circuit stratum, user input stratum and display stratum components;
    wherein the signal receiving components include first radio frequency receiving components for receiving a first display signal having first display information carried on a first radio frequency and second radio frequency receiving components for receiving a second display signal having second display information carried on a second radio frequency, and
    wherein the display driving components includes signal processor components for receiving the first display signal and the second display signal and generating a display driving signal for simultaneously displaying the first display information at a first location on the display stratum and the second display information at a second location on the display stratum.

2. A thin, lightweight, flexible, bright, wireless display according to claim 1; wherein the battery stratum comprises a first current collector layer; an anode layer; an electrolyte layer comprised of a liquid conductive electrolyte and a polymer forming a leakproof electrolyte layer; a cathode layer and a second current collector layer, wherein said battery stratum is formed substantially over the entire top surface of the flexible substrate.

3. A thin, lightweight, flexible, bright, wireless display according to claim 1; wherein the user input stratum comprises a grid of conductive elements each conductive elements for inducing a detectable electrical signal in response to a moving magnetic field.

4. A thin, lightweight, flexible, bright, wireless display according to claim 1; wherein the user input stratum comprises a touch screen formed by printing pressure sensitive or capacitance sensitive elements on an insulative layer.

5. A thin, lightweight, flexible, bright, wireless display according to claim 1; wherein the display stratum includes conductive leads connected with each light emitting pixel for applying the electrical energy selectively to each light emitting pixel under the control of the display driving components.

6. A thin, lightweight, flexible, bright, wireless display according to claim 1; wherein at least some of the components in the battery, display, user input and electronic circuit stratum are formed by printing electrically active material to form circuit elements including resistors, capacitors, inductors, antennas, conductors and semiconductor devices.

7. A thin, lightweight, flexible, bright, wireless display having components capable of being manufactured by a printing method, comprising:
    a flexible substrate having a top surface for providing a support structure upon which components can be manufactured by a printing method;
    a display stratum comprising light emitting pixels for displaying information, the light emitting pixels being formed by providing an insulative layer, printing a y-electrodes layer comprising lines of a conductive material formed over the insulative layer, printing a pixel layer of light-emitting conductive polymer islands over the y-electrode layer, and printing an x-electrodes layer comprising lines of a transparent conductive material over the pixel layer;
    an electronic circuit stratum including signal transmitting components for transmitting user input signals, signal receiving components for receiving display information, and display driving components for driving the display stratum according to the received display information;
    a user input stratum for receiving user input and generating the user input signals; and
    a battery stratum for providing electrical energy to the electronic circuit stratum, user input stratum and display stratum components;
    wherein the signal receiving components include first radio frequency receiving components for receiving a first display signal having first display information carried on a first radio frequency and second radio frequency receiving components for receiving a second display signal having second display information carried on a second radio frequency, and
    wherein the display driving components includes signal processor components for receiving the first display signal and the second display signal and generating a display driving signal for simultaneously displaying the first display information at a first location on the display stratum and the second display information at a second location on the display stratum.

8. A thin, lightweight, flexible, bright, wireless display according to claim 7; wherein the battery stratum comprises a first current collector layer printed on a flexible insulative substrate which may be the flexible substrate; one of an anode layer and a cathode layer printed on the first current collector layer; a microencapsulated electrolyte layer printed on said one of the anode layer and the cathode layer; and an other one of the anode layer and the cathode layer printed on the electrolyte layer and a second current collector layer printed on said other one of the anode layer and the cathode layer; wherein said battery stratum is formed substantially over the entire top surface of the flexible substrate.

9. A thin, lightweight, flexible, bright, wireless display according to claim 7; wherein the user input stratum comprises a grid of conductive elements printed on an insulative layer, said conductive elements being for inducing a detectable electrical signal in response to a moving magnetic field.

10. A thin, lightweight, flexible, bright, wireless display according to claim 9; wherein each said conductive element being formed in the shape of a coil.

11. A thin, lightweight, flexible, bright, wireless display according to claim 7; wherein the display stratum includes printed conductive leads connected with each light emitting pixel for applying the electrical energy selectively to each light emitting pixel under the control of the display driving components.

12. A thin, lightweight, flexible, bright, wireless display according to claim 7; wherein at least some of the components in the battery, display, user input and electronic circuit stratum are formed by printing electrically active material to form circuit elements including resistors, capacitors, inductors, antennas, conductors and semiconductor devices.

13. A thin, lightweight, flexible, bright, wireless display having components capable of being manufactured by a printing method, comprising:
 a flexible substrate for providing a support structure upon which components can be manufactured by a printing method;
 a display stratum comprising light emitting pixels for displaying information, the light emitting pixels being formed by printing a pixel layer of light-emitting conductive polymer;
 an electronic circuit stratum including user input mapping components for receiving user input signals and determining a physical location on the display at which said user input signals are received and determining mapped user input signals, signal transmitting components for transmitting the mapped user input signals, signal receiving components for receiving display information, and display driving components for driving the display stratum according to the received display information;
 a user input stratum for receiving user input and generating the user input signals; and
 a battery stratum for providing electrical energy to the electronic circuit stratum, user input stratum and display stratum components;
 wherein the signal receiving components include first radio frequency receiving components for receiving a first display signal having first display information carried on a first radio frequency and second radio frequency receiving components for receiving a second display signal having second display information carried on a second radio frequency, and
 wherein the display driving components includes signal processor components for receiving the first display signal and the second display signal and generating a display driving signal for simultaneously displaying the first display information at a first location on the display stratum and the second display information at a second location on the display stratum.

14. A thin, lightweight, flexible, bright, wireless display according to claim 13; wherein the battery stratum comprises a first current collector layer printed on a flexible insulative substrate which may be the flexible substrate, one of an anode layer and a cathode layer printed on the first current collector layer; an electrolyte layer printed on said one of the anode layer and the cathode layer; and an other one of the anode layer and the cathode layer printed on the electrolyte layer and a second current collector layer printed on said other one of the anode layer and the cathode layer.

15. A thin, lightweight, flexible, bright, wireless display according to claim 13; wherein the user input stratum comprises a grid of conductive elements printed on an insulative layer, said conductive elements being for inducing a detectable electrical signal in response to a moving magnetic field.

16. A thin, lightweight, flexible, bright, wireless display according to claim 13; wherein the display stratum includes printed conductive leads connected with each light emitting pixel for applying the electrical energy selectively to each light emitting pixel under the control of the display driving components, the light emitting pixels being formed by providing an insulative layer, printing a y-electrodes layer comprising lines of a conductive material formed over the insulative layer, printing a pixel layer of light-emitting conductive polymer islands over the y-electrode layer, and printing an x-electrodes layer comprising lines of a transparent conductive material over the pixel layer.

17. A thin, lightweight, flexible, bright, wireless display according to claim 13; wherein at least some of the components in the battery, display, user input and electronic circuit stratum are formed by printing electrically active material to form circuit elements including resistors, capacitors, inductors, antennas, conductors and semiconductor devices.

18. A thin, lightweight, flexible, bright, wireless display having components capable of being manufactured by a printing method, comprising:
 a flexible substrate having a top surface for providing a support structure upon which components can be manufactured by a printing method;
 a display stratum comprising light emitting pixels for displaying information, the light emitting pixels being formed by printing a pixel layer of light-emitting conductive polymer;
 an electronic circuit stratum including signal transmitting components for transmitting user input signals to an external display signal generating device for controlling display information transmitted from the external display signal generating device, signal receiving components for receiving the display information transmitted from the display signal generating device, the display information including at least first and second display information, and display driving components for generating display driving signals for driving the display stratum for simultaneously displaying the first display information at a first location on the display stratum and the second display information at a second location on the display stratum;
 a user input stratum for receiving user input and generating the user input signals; and
 a battery stratum for providing electrical energy to the electronic circuit stratum, user input stratum and display stratum components.

19. A thin, lightweight, flexible, bright, wireless display according to claim 18, wherein the first and second display information includes at least hyperlinked content data, audio and video streamed data, broadcast streamed data and still image screen data.

* * * * *